United States Patent
Jung et al.

(10) Patent No.: US 8,161,430 B2
(45) Date of Patent: Apr. 17, 2012

(54) SYSTEM AND METHOD OF RESISTANCE BASED MEMORY CIRCUIT PARAMETER ADJUSTMENT

(75) Inventors: Seong-Ook Jung, Seoul (KR); Jisu Kim, Seoul (KR); Jee-Hwan Song, Seoul (KR); Seung H. Kang, San Diego, CA (US); Sei Seung Yoon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 833 days.

(21) Appl. No.: 12/107,252

(22) Filed: Apr. 22, 2008

(65) Prior Publication Data

US 2009/0265678 A1   Oct. 22, 2009

(51) Int. Cl.
*G06F 17/50* (2006.01)
(52) U.S. Cl. ........................................ 716/100
(58) Field of Classification Search ............... 716/100
See application file for complete search history.

(56) References Cited

U.S. PATENT DOCUMENTS

| | | | |
|---|---|---|---|
| 7,082,389 B2 | 7/2006 | Nahas | |
| 2004/0062117 A1* | 4/2004 | Perner et al. | 365/209 |
| 2007/0001764 A1* | 1/2007 | Huang et al. | 330/261 |
| 2009/0225590 A1* | 9/2009 | Oh et al. | 365/163 |
| 2010/0321987 A1* | 12/2010 | Lung et al. | 365/163 |

OTHER PUBLICATIONS

Written Opinion—PCT/US2009/038924—International Search Authority European Patent Office—Mar. 31, 2009.

* cited by examiner

*Primary Examiner* — Jack Chiang
*Assistant Examiner* — Suchin Parihar
(74) *Attorney, Agent, or Firm* — Sam Talpalatsky; Nicholas J. Pauley; Jonathan T. Velasco

(57) ABSTRACT

Systems and methods of resistance based memory circuit parameter adjustment are disclosed. In a particular embodiment, a method of determining a set of parameters of a resistance based memory circuit includes selecting a first parameter based on a first predetermined design constraint of the resistance based memory circuit and selecting a second parameter based on a second predetermined design constraint of the resistance based memory circuit. The method further includes performing an iterative methodology to adjust at least one circuit parameter of a sense amplifier portion of the resistance based memory circuit by selectively assigning and adjusting a physical property of the at least one circuit parameter to achieve a desired sense amplifier margin value without changing the first parameter or the second parameter.

41 Claims, 14 Drawing Sheets

SYSTEM AND METHOD OF RESISTANCE BASED MEMORY CIRCUIT PARAMETER ADJUSTMENT

I. FIELD

The present disclosure is generally related to a system and method of adjusting resistance based memory circuit parameters.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. However, power consumption of such portable devices can quickly deplete a battery and diminish a user's experience.

Reducing power consumption has led to smaller circuitry feature sizes and operating voltages within such portable devices. Reduction of feature size and operating voltages, while reducing power consumption, also increases sensitivity to noise and to manufacturing process variations. Such increased sensitivity to noise and process variations may be difficult to overcome when designing memory devices that use sense amplifiers.

III. SUMMARY

Research conducted by Professor Seong-Ook Jung, Jisu Kim, and Jee-Hwan Song of Yonsei University, in conjunction with Seung H. Kang and Sei Seung Yoon of Qualcomm Inc., has resulted in novel systems and methods of resistance based memory circuit parameter adjustment.

In a particular embodiment, a method of determining a set of parameters of a resistance based memory circuit is disclosed. The method includes selecting a first parameter based on a first predetermined design constraint of the resistance based memory circuit and selecting a second parameter based on a second predetermined design constraint of the resistance based memory circuit. The method further includes performing an iterative methodology to adjust at least one circuit parameter of a sense amplifier portion of the resistance based memory circuit by selectively assigning and adjusting a physical property of the at least one circuit parameter to achieve a desired sense amplifier margin value without changing the first parameter or the second parameter.

In another particular embodiment, a method of determining a set of parameters is disclosed. The method includes selecting a first parameter based on a first predetermined design constraint of a spin torque transfer magnetoresistive random access memory (STT-MRAM) and selecting a second parameter based on a second predetermined design constraint of the STT-MRAM. The method further includes performing an iterative methodology to adjust at least one circuit parameter of a sense amplifier portion of the STT-MRAM by selectively adjusting a physical property of the at least one circuit parameter to achieve a desired sense amplifier margin value but without changing the first parameter or the second parameter.

In another particular embodiment, a processor readable medium storing processor instructions is disclosed. The processor instructions are executable to cause a processor to receive a first input of a first parameter based on a first predetermined design constraint of a resistance based memory circuit. The processor instructions are also executable to cause the processor to receive a second input of a second parameter based on a second predetermined design constraint of the resistance based memory circuit. The processor instructions are further executable to cause the processor to perform an iterative methodology to adjust at least one circuit parameter of a sense amplifier portion of the resistance based memory circuit by selectively adjusting a physical property of the at least one circuit parameter to achieve a desired sense amplifier margin value without changing the first parameter or the second parameter. The processor instructions are also executable to cause the processor to store a value associated with the physical property after the desired sense amplifier margin value is achieved given the predetermined first and second design constraints.

A particular advantage provided by disclosed embodiments is that circuit parameters may be determined to achieve a desired sense amplifier margin at a resistance based memory circuit having other design constraints. Circuit parameters may be iteratively adjusted based on physical device and circuit characteristics to efficiently improve sense amplifier margins.

Other aspects, advantages, and features of the present disclosure will become apparent after review of the entire application, including the following sections: Brief Description of the Drawings, Detailed Description, and the claims.

IV. BRIEF DESCRIPTION OF THE DRAWINGS

Figure 1:
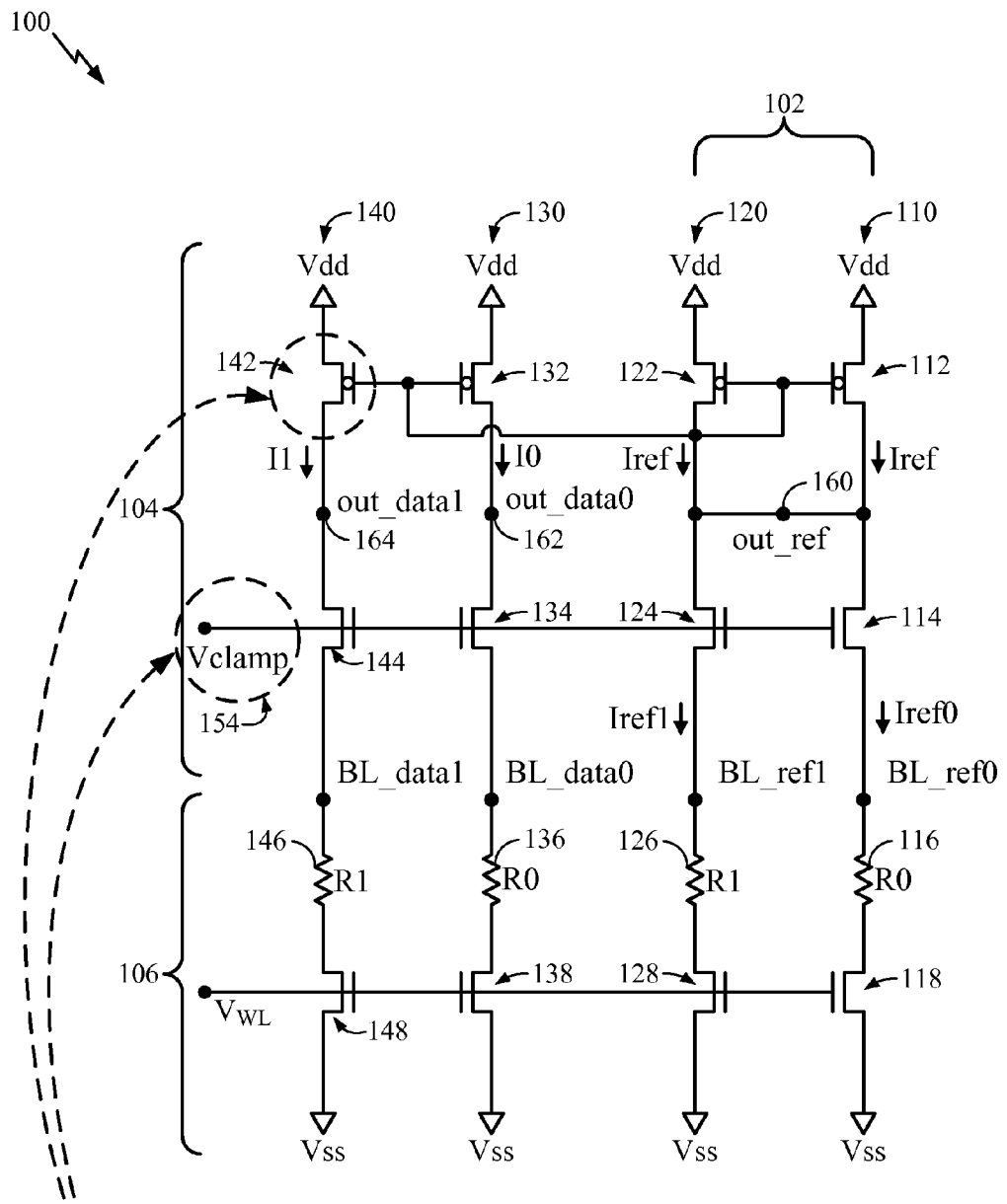
FIG. 1 is a circuit diagram of a particular illustrative embodiment of a resistance based memory.
Figure 10:
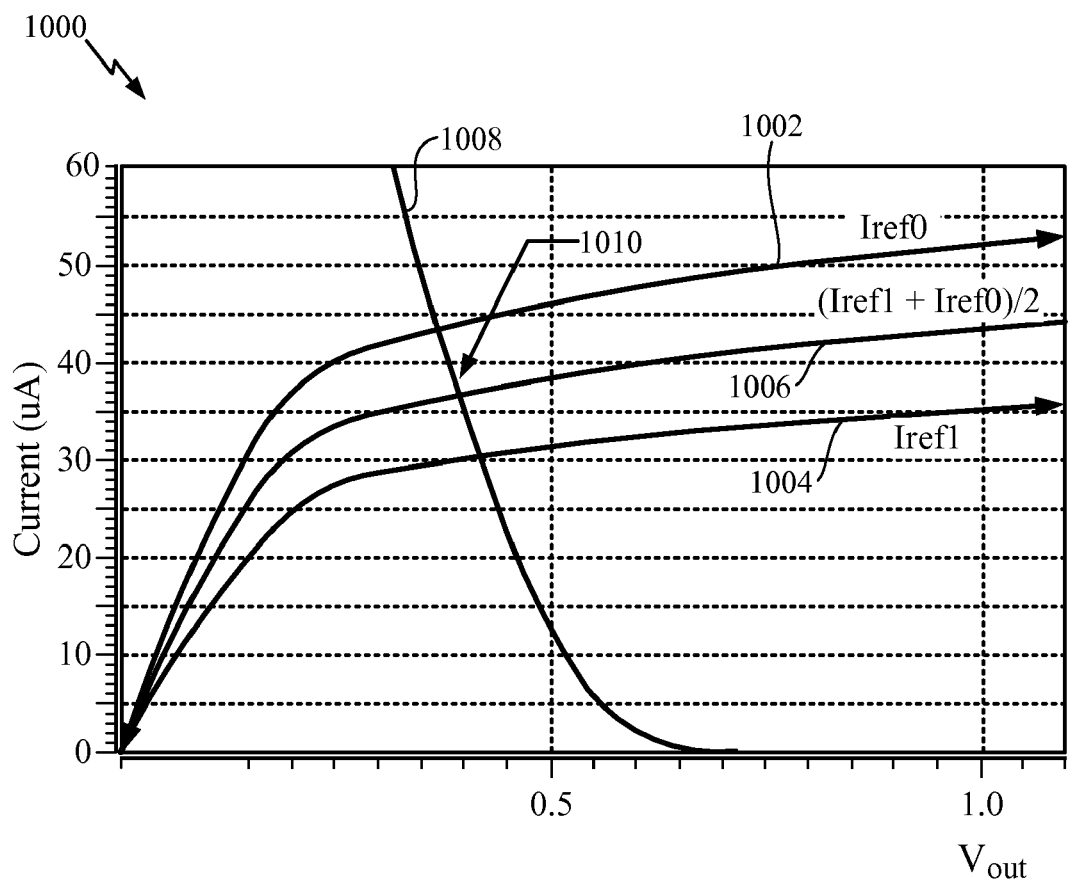
Figure 11:
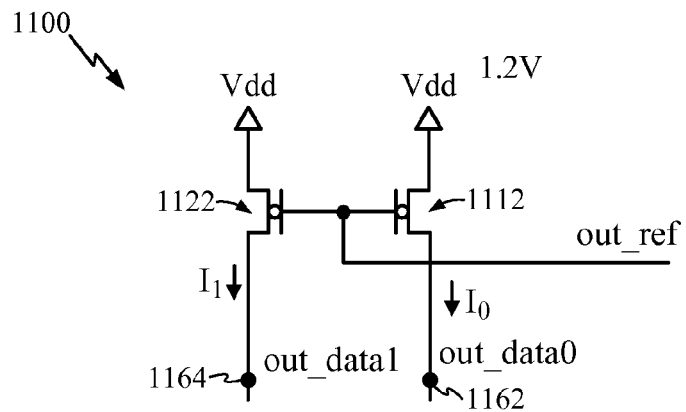
Figure 13:
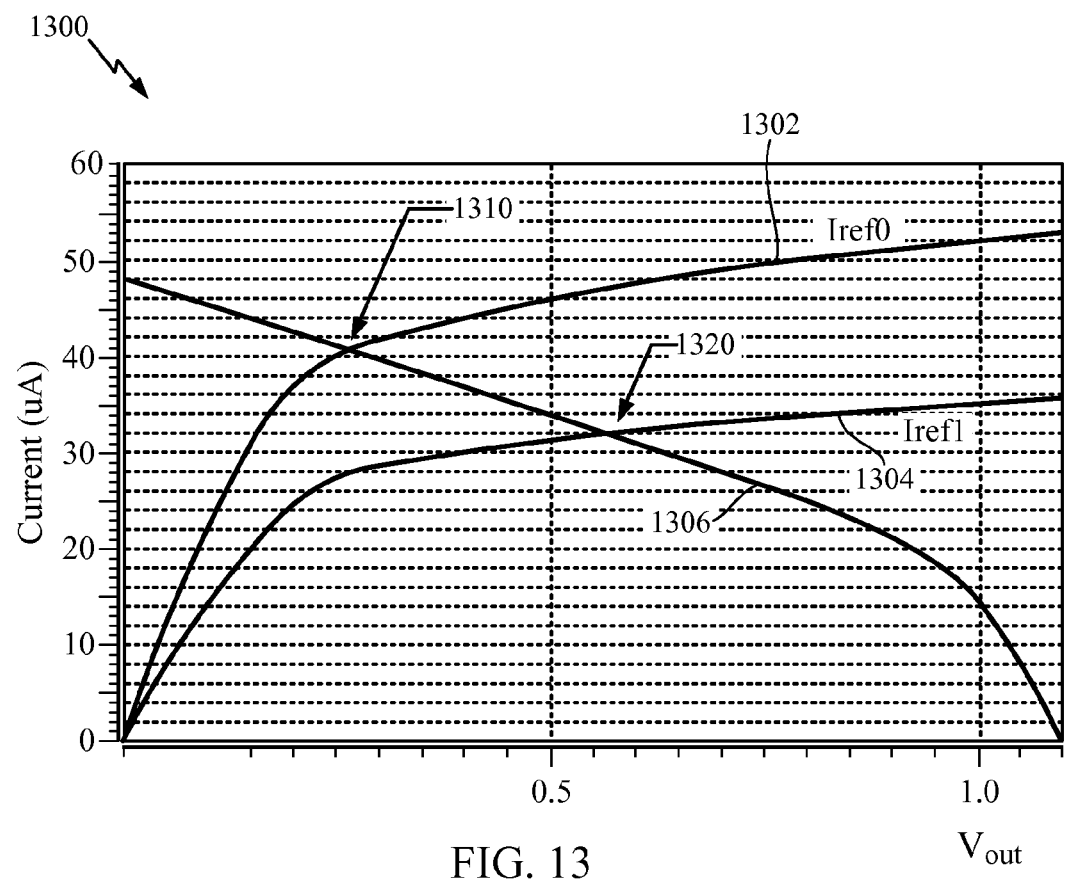
Figure 14:
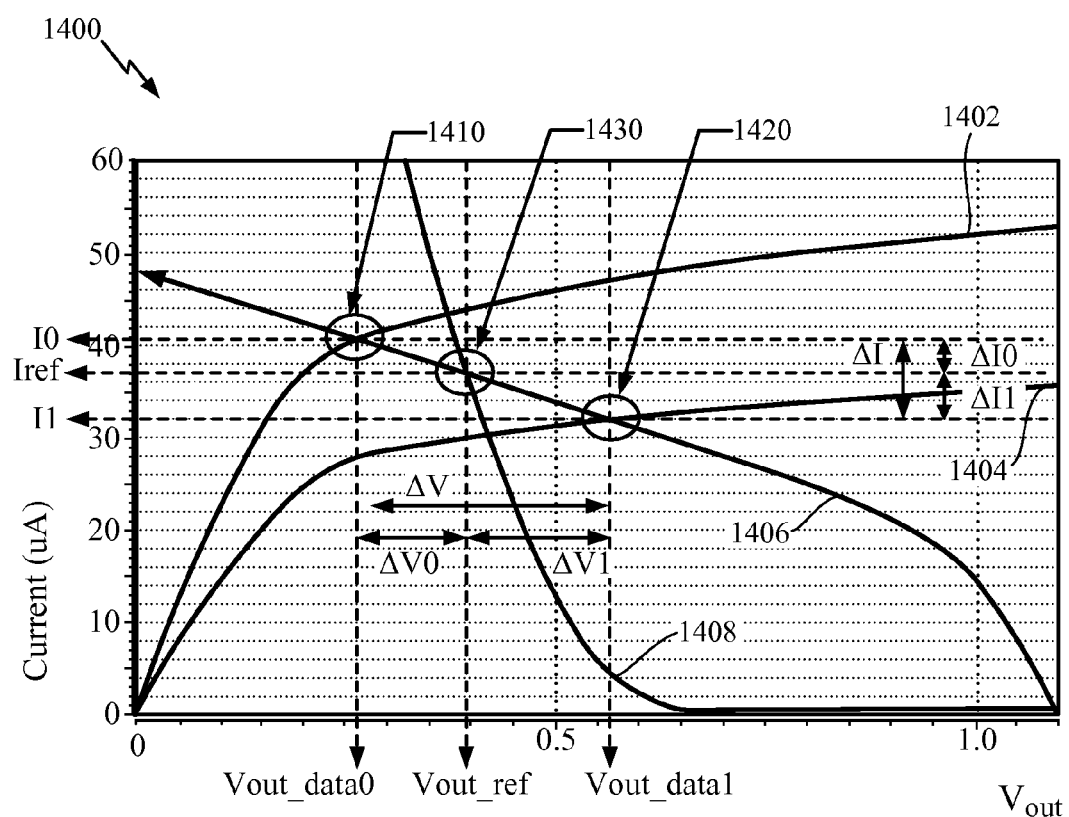
Figure 15:
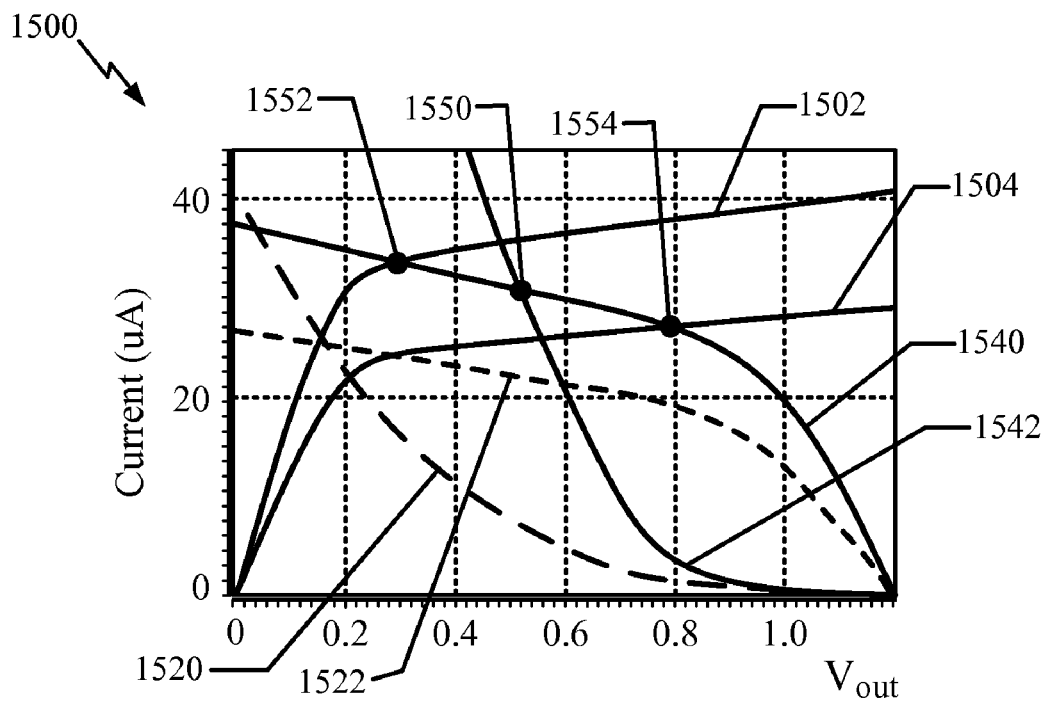
Figure 16:
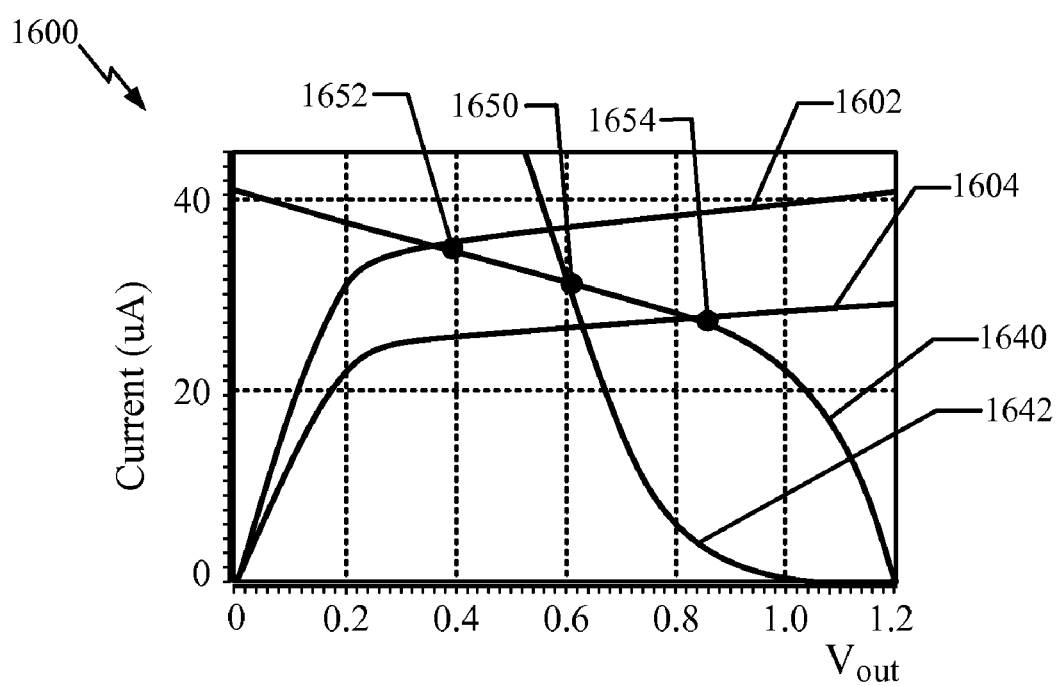
Figure 17:
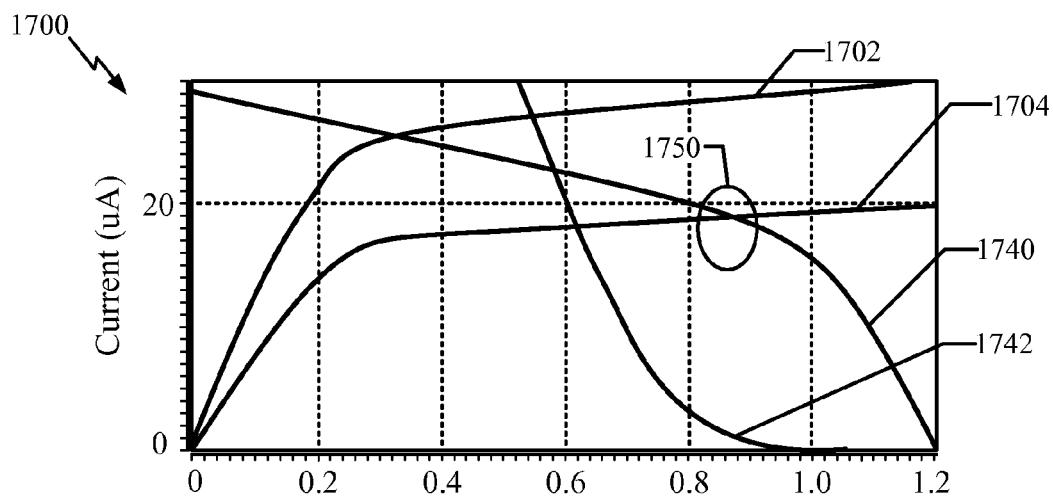
Figure 18:
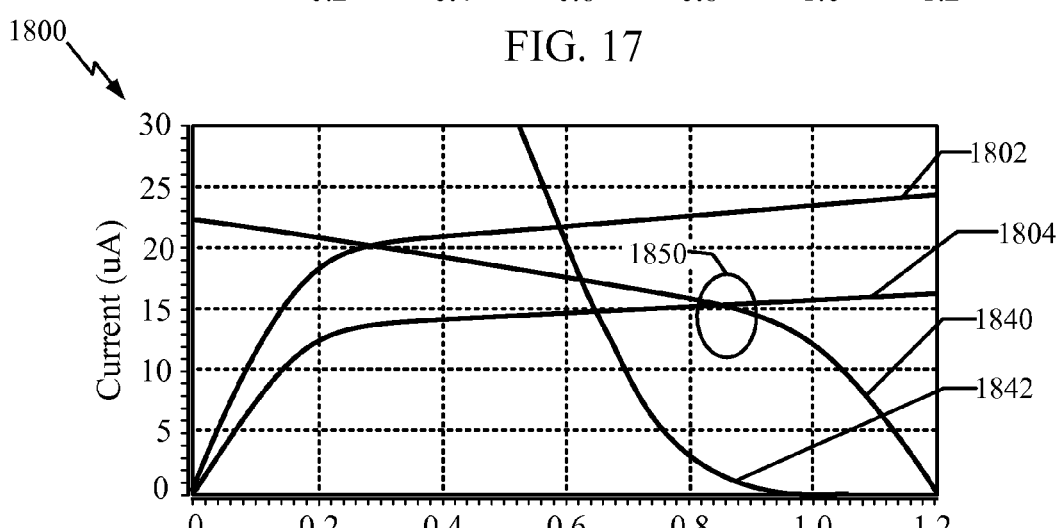
Figure 19:
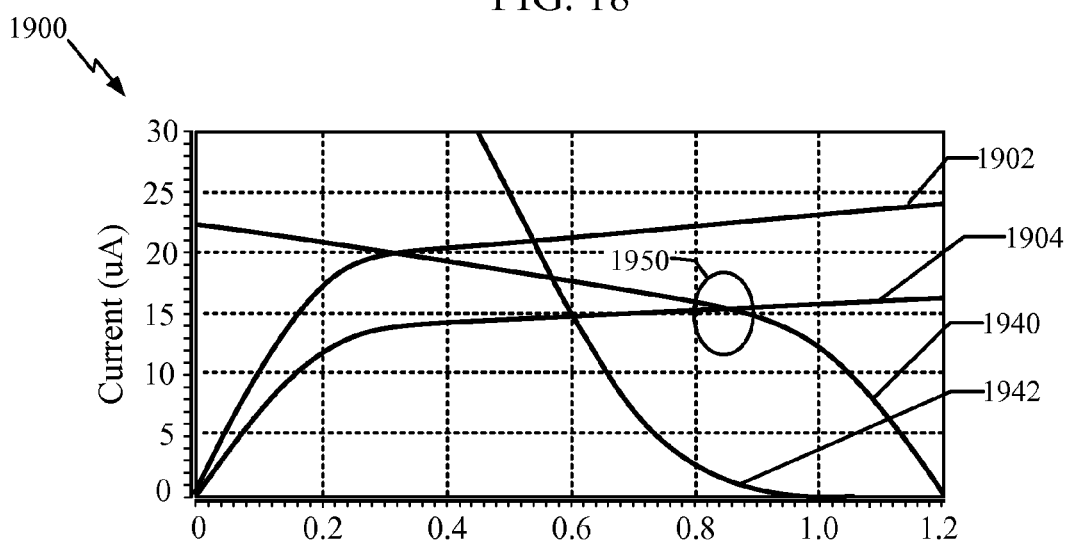
Figure 20:
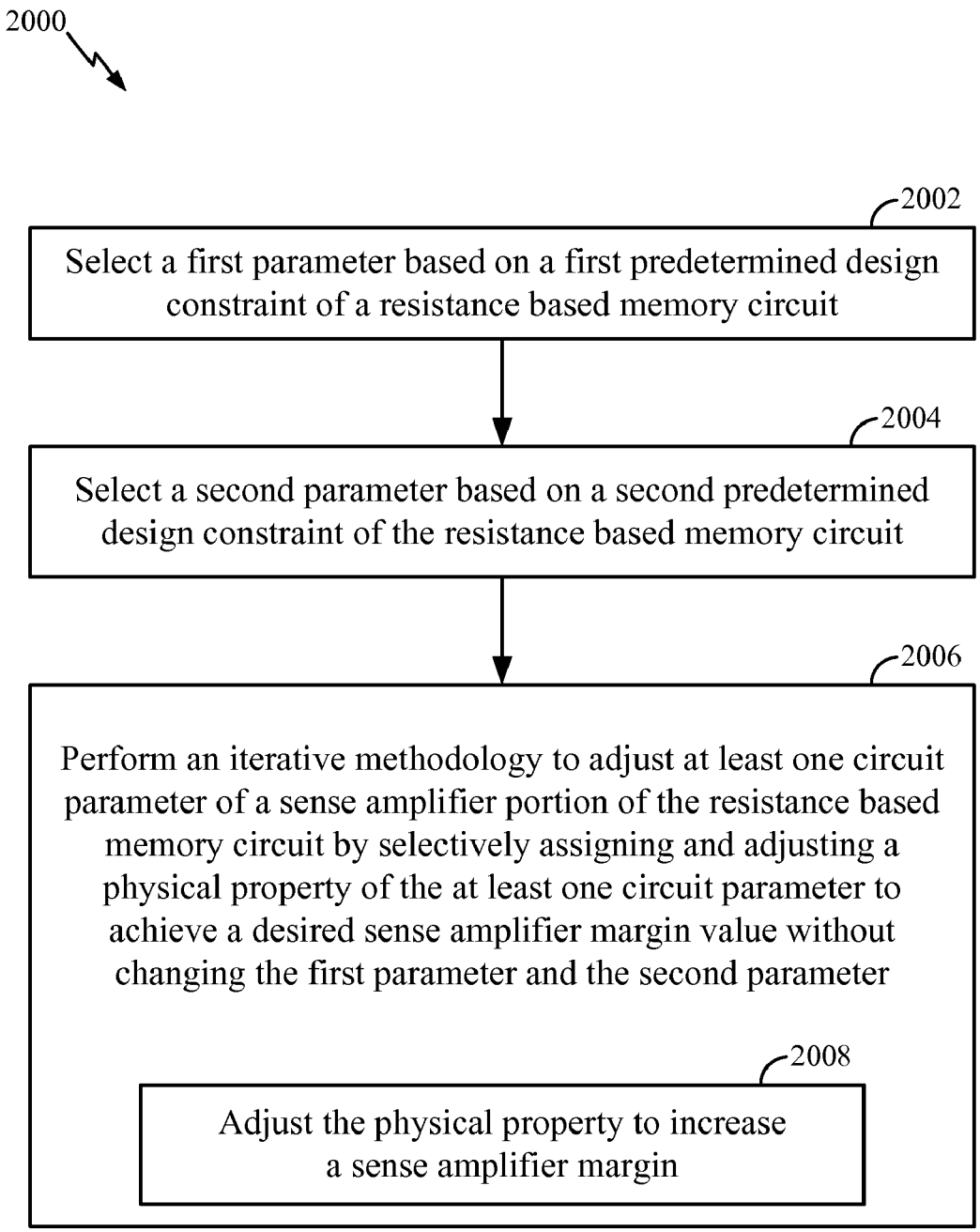
Figure 21:
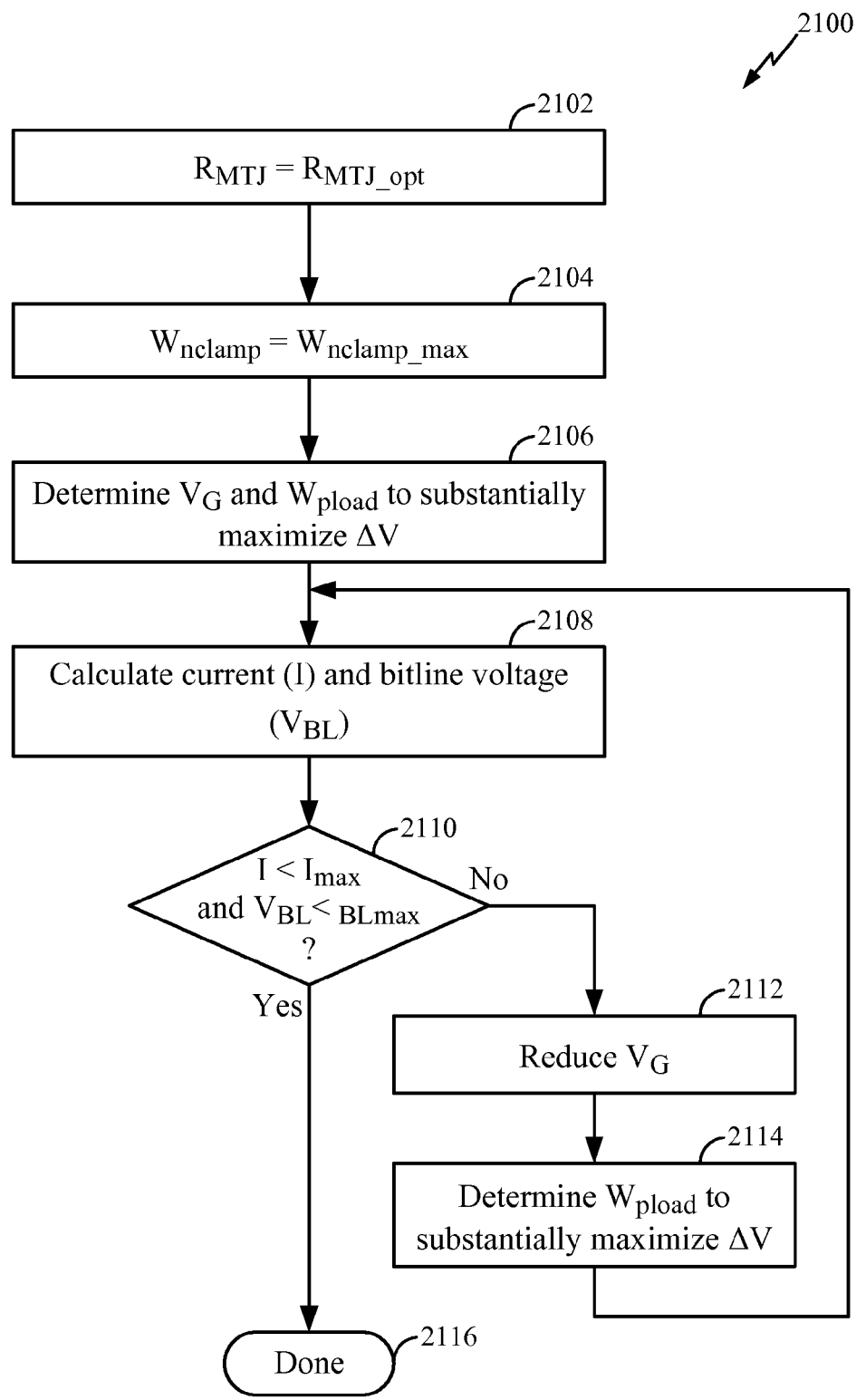
Figure 22:
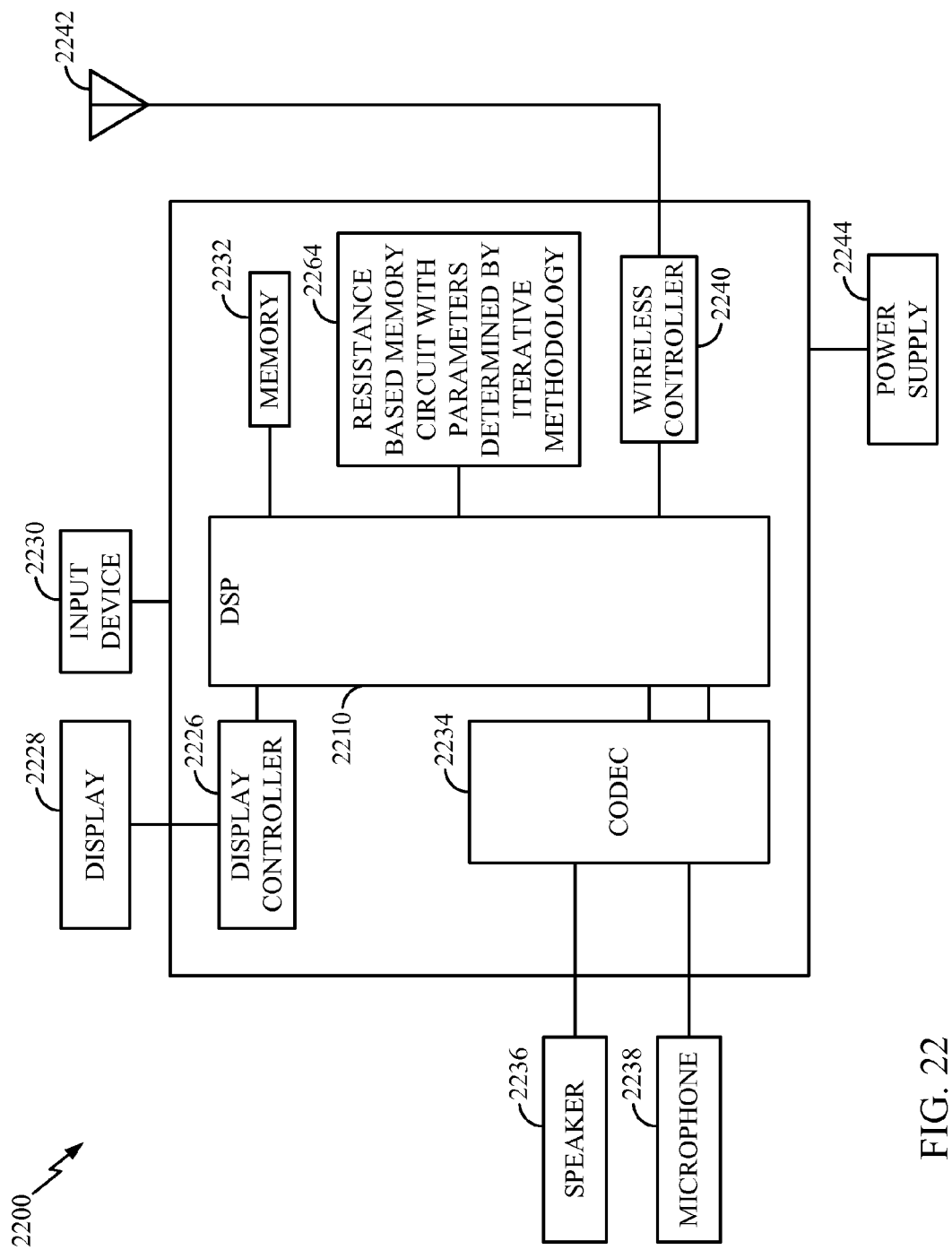

FIG. 9 includes diagrams of a particular illustrative embodiment of current-voltage characteristics of a load device portion of a circuit associated with a reference cell of a resistance based memory device;

FIG. 10 is a diagram of a particular illustrative embodiment of a load line characteristic of the reference circuit depicted in FIG. 1;

FIG. 11 is a diagram of a particular illustrative embodiment of a load portion of a circuit associated with a data cell of a resistance based memory device;

FIG. 12 includes diagrams of a particular illustrative embodiment of current-voltage characteristics of a load device portion of a circuit associated with a data cell of a resistance based memory device;

FIG. 13 is a diagram of a particular illustrative embodiment of load line characteristics of data paths depicted in FIG. 1;

FIG. 14 is a diagram graphically depicting a particular illustrative embodiment of operational parameter values associated with load line characteristics depicted in FIG. 10 and FIG. 13;

FIG. 15 is a diagram of a first particular illustrative embodiment of characteristics of the memory depicted in FIG. 1;

FIG. 16 is a diagram of a second particular illustrative embodiment of characteristics of the memory depicted in FIG. 1;

FIG. 17 is a diagram of a particular illustrative embodiment of characteristics of a resistance based memory device having a current exceeding a threshold value;

FIG. 18 is a diagram of a particular illustrative embodiment of the resistance based memory device of FIG. 17 with a reduced gate voltage of a clamp device;

FIG. 19 is a diagram of a particular illustrative embodiment of the resistance based memory device of FIG. 17 with a reduced size of a clamp device;

FIG. 20 is a flow diagram of a first particular embodiment of a method of determining a set of parameters of a resistance based memory circuit;

FIG. 21 is a flow diagram of a second particular embodiment of a method of determining a set of parameters of a resistance based memory circuit; and FIG. 22 is a block diagram of a particular illustrative embodiment of an electronic device including a resistance based memory circuit that has parameters determined by an iterative methodology.

V. DETAILED DESCRIPTION

Referring to FIG. 1, a particular illustrative embodiment of a resistance based memory is depicted and generally designated 100. The memory 100 includes a reference circuit 102 having a first reference path 110 and a second reference path 120. The memory 100 also includes a representative bit-zero data path 130 and a representative bit-one data path 140. The reference paths 110 and 120 and the data paths 130 and 140 are generally designated as having a sense amplifier portion 104 that provides load elements to a memory cell portion 106 to generate an output signal for comparison at a second sense amplifier (not shown). In a particular embodiment, the memory 100 is a magnetoresistive random access memory (MRAM), a phase-change random access memory (PRAM), or a spin torque transfer MRAM (STT-MRAM).

The first reference path 110 includes a load device, such as a p-channel metal oxide semiconductor (PMOS) field effect transistor load 112. The PMOS load 112 is coupled to a reference node (out_ref) 160, which in turn is coupled to a clamp transistor 114. A resistance R0 116 corresponding to a logic "zero" state of a resistance based memory element is coupled to the clamp transistor 114. A resistance based memory element is a device having a first resistance corresponding to a logic "one" value and a second resistance corresponding to a logic "zero" value, such as a magnetic tunnel junction (MTJ) device or a PRAM memory cell as illustrative, non-limiting examples. An access transistor 118 is coupled to the resistance R0 116.

The second reference path 120 includes a load device, such as a PMOS load 122. The PMOS load 122 is coupled to the reference node (out_ref) 160, which in turn is coupled to a clamp transistor 124. A resistance R1 126 corresponding to a logic "one" state of a resistance based memory element is coupled to the clamp transistor 124. An access transistor 128 is coupled to the resistance R1 126.

The representative bit-zero data path 130 includes a load device, such as a PMOS load 132. The PMOS load 132 is coupled to a reference node (out_data0) 162, which in turn is coupled to a clamp transistor 134. A resistance based memory element having a logic "zero" state is represented as a resistance R0 136, which is coupled to the clamp transistor 134. An access transistor 138 is coupled to the resistance R0 136.

The representative bit-one data path 140 includes a load device, such as a PMOS load 142. The PMOS load 142 is coupled to a reference node (out_data1) 164, which in turn is coupled to a clamp transistor 144. A resistance based memory element having a logic "one" state is represented as a resistance R1 146, which is coupled to the clamp transistor 144. An access transistor 148 is coupled to the resistance R1 146.

Generally, corresponding components of each of the paths 110, 120, 130, 140 may have similar configurations and may operate in a substantially similar manner. Each of the clamp transistors 114, 124, 134, and 144 functions to limit current and voltage through the respective paths 110, 120, 130, and 140 based on a signal Vclamp 144. Vclamp 144 represents a common gate voltage that enables the clamp transistors 114, 124, 134, and 144 to function as clamping transistors. Each of the access transistors 118, 128, 138, and 148 selectively allows current flow through the respective paths 110, 120, 130, and 140 based on a common signal $V_{WL}$ that represents a common gate voltage to the access transistors 118, 128, 138, and 148. Each of the PMOS load devices 112, 122, 132, and 142 has a gate terminal that is coupled to the out_ref node 160.

In a particular embodiment, a signal margin $\Delta V$, such as a sense amplifier margin, corresponds to a difference between a voltage at the out_data1 node 164 and a voltage at the out_ref node 160 ($\Delta V_1$), or a difference between a voltage at the out_ref node 160 and a voltage at the out_data0 node 162 ($\Delta V_0$), whichever is smaller. The signal margin may be improved by increasing a difference between the voltage at the out_data1 node 164 and the voltage at the out_data0 node 162. An iterative method 170 to determine a value for Vclamp and a width of the PMOS loads 112, 122, 132, and 142 based on one or more design constraints may enable a designer of the memory 100 to adjust circuit parameters in a manner that satisfies design constraints while enabling the signal margin $\Delta V$ to approach a physically maximum value given the design constraints.

Figure 2:
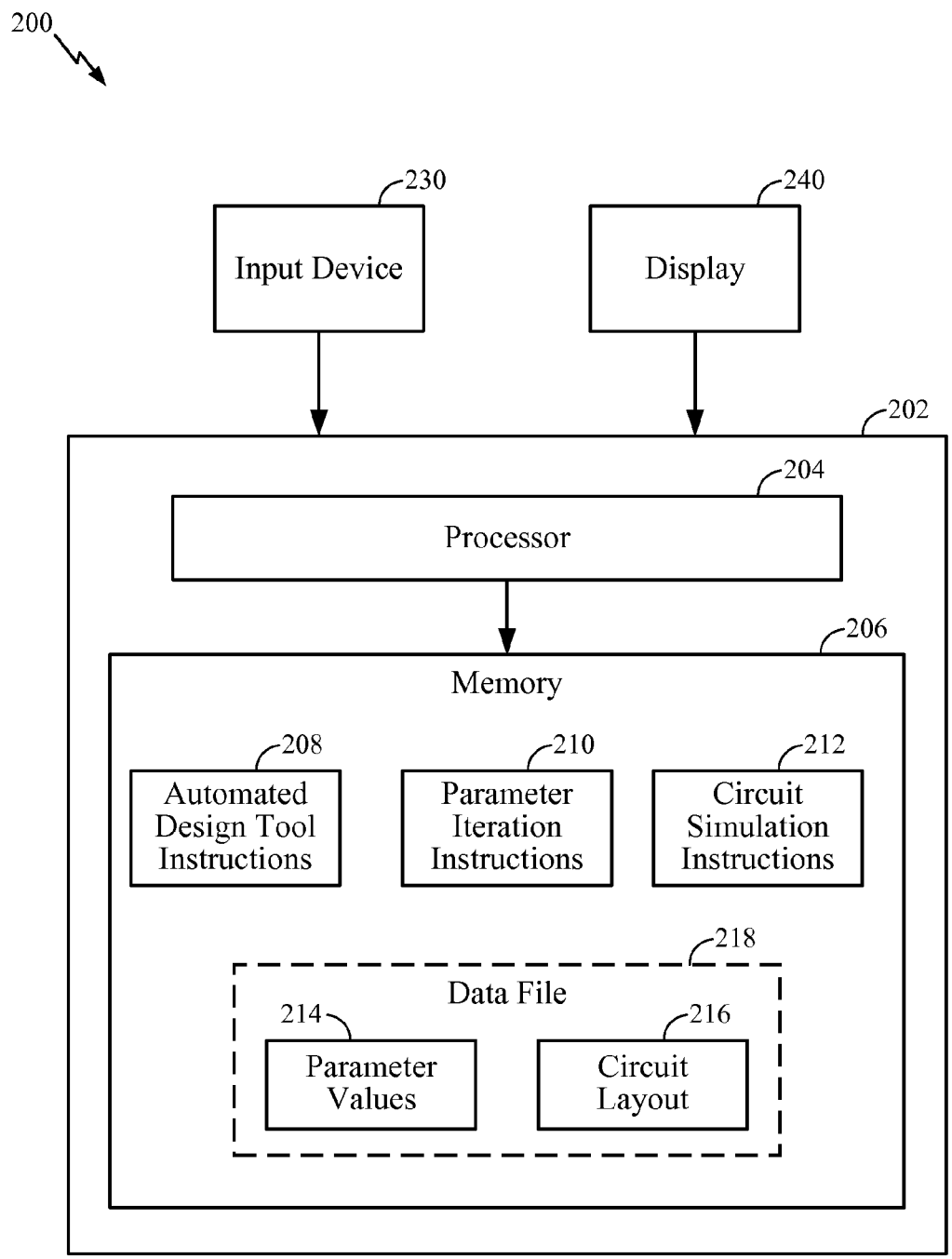
FIG. 2 is a block diagram of particular illustrative embodiment of a system to determine resistance based memory circuit parameters of a memory, such as the memory of FIG. 1.

Referring to FIG. 2, a block diagram of particular illustrative embodiment of a system to determine resistance based memory circuit parameters is depicted and generally designated 200. In a particular embodiment, the system 200 may be configured to perform the iterative method 170 depicted in FIG. 1. The system 200 includes a device 202 having at least one processor 204 and a memory 206 that is accessible to the processor 204. The memory 206 includes media that is readable by the processor 204 and that stores data and program instructions that are executable by the processor 204, including automated design tool instructions 208, parameter iteration instructions 210, circuit simulation instructions 212, and a data file 218 that includes parameter values 214 and a circuit layout 216. An input device 230 and a display 240 are coupled to the device 202. In a particular embodiment, the input device 230 may include a keyboard, a pointing device, a touch screen, a speech interface, another device to receive user input, or any combination thereof.

In a particular embodiment, the automated design tool instructions 208 are executable by the processor 204 to enable a user to design a circuit via the input device 230 and the display 240, and to store data associated with elements and connections of the circuit as the circuit layout 216. One or more device or circuit parameters associated with the circuit may be stored as parameter values 214. The circuit simulation instructions 212 may be executable by the processor 204 to read data from the data file 218 and to perform one or more simulations to model a behavior of the circuit. The parameter iteration instructions 210 may be executable by the processor 204 to cause the processor 204 to perform iterative adjustments of parameters of one or more circuits, such as a circuit of the memory 100 depicted in FIG. 1, in conjunction with the circuit simulation instructions 212.

In an illustrative embodiment, the parameter iteration instructions 210 are executable by the processor 204 to receive a first input of a first parameter based on a first predetermined design constraint of a resistance based memory circuit. The parameter iteration instructions 210 are executable by the processor 204 to receive a second input of a second parameter based on a second predetermined design constraint of the resistance based memory circuit. For example, the first and second parameters may include a process parameter, such as a resistance value associated with one or more of the memory elements 116, 126, 136, and 146, or a device parameter, such as a width of the clamp transistors 114, 124, 134, and 144, a width of the access transistors 118, 128, 138, and 148, a gate voltage Vclamp applied to the clamp transistors 114, 124, 134, and 144, and a width of the PMOS loads 112, 122, 132, and 142, depicted in FIG. 1. Illustrative examples of predetermined design constraints include a logic "zero" resistance value of a magnetic tunnel junction (MTJ) device to substantially maximize signal margin, a read current limitation of a MTJ device in a bit "one" state to prohibit a read disturbed write where a read operation writes a value to the MTJ device, a maximum bitline voltage $V_{BL}$ at the memory cell portion, such at the node BL_data1 of FIG. 1, to maintain a reasonable value of a magnetic resistance (MR) ratio of a MTJ device, and a maximum transistor size of a sense amplifier portion that satisfies a bitline-to-input/output multiplexer scheme.

The parameter iteration instructions 210 may also be executable by the processor 204 to perform an iterative methodology to adjust at least one circuit parameter of a sense amplifier portion of the resistance based memory circuit by selectively adjusting a physical property of the at least one circuit parameter to achieve a desired sense amplifier margin value without changing the first parameter or the second parameter. For example, the iterative methodology may begin with determining an initial value of a gate voltage of a clamp transistor of the sense amplifier portion, such as Vclamp of FIG. 1, and an initial value of a width of a load transistor of the sense amplifier portion, such as a width of the PMOS loads 112, 122, 132, and 142 of FIG. 1, that together result in a substantially maximum sense amplifier margin value given the first parameter and the second parameter. A current of the sense amplifier portion may be determined using the initial value of the gate voltage and the initial value of the width of the load transistor, and the current of the sense amplifier portion may be compared to a predetermined current threshold. A bitline voltage $V_{BL}$ at the memory cell portion may also be determined and compared to a predetermined bitline voltage threshold ($V_{BLmax}$).

A physical property, such as a gate voltage or a load transistor width, may be selectively adjusted when the current exceeds the predetermined current threshold or the bitline voltage exceeds the predetermined voltage threshold by determining a reduced gate voltage and determining a second width of the load transistor that results in a substantially maximum sense amplifier margin value given the first parameter, the second parameter, and the reduced gate voltage. A revised current of the sense amplifier portion may also be determined using the reduced gate voltage and the second width of the load transistor. This process may be repeated, by reducing the gate voltage and re-determining the load transistor width, until a current through the circuit does not exceed the threshold and the bitline voltage does not exceed the predetermined bitline voltage threshold.

The parameter iteration instructions 210 may also be executable by the processor 204 to store a value associated with the physical property after the desired sense amplifier margin is achieved given the predetermined first and second design constraints. For example, one or more values associated with the physical property, such as the width of the PMOS loads 112, 122, 132, and 142, the voltage applied to the clamp transistors 114, 124, 134, and 144, other values associated with physical properties of circuit elements, or any combination thereof, may be stored with the parameter values 214. As another example, the data file 218 may be output to represent a circuit design of the resistance based memory circuit having the desired sense amplifier margin.

Although depicted as separate components, the automated design tool instructions 208, the parameter iteration instructions 210, the circuit simulation instructions 212, or any combination thereof, may be integrated into a single software package or software applications that are compatible to interoperate with each other. As an illustrative, non-limiting example, the automated design tool instructions 208 and the circuit simulation instructions 212 may be portions of a commercial computer-aided design (CAD) tool, and the parameter iteration instructions 210 may be implemented as scripts or other instructions compatible to be used with the commercial CAD tool.

Figure 3:
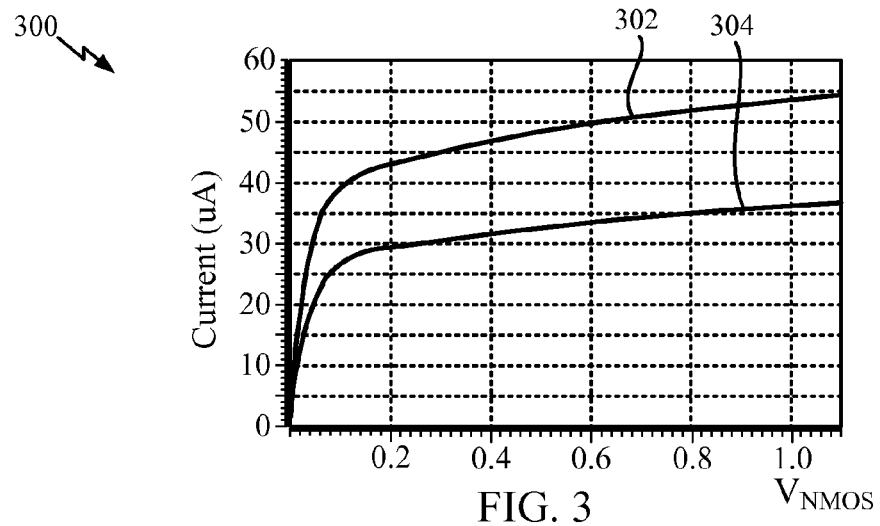
FIG. 3 is a diagram of a particular illustrative embodiment of current-voltage characteristics of a clamp device of a resistance based memory.

Referring to FIG. 3, a diagram of a particular illustrative embodiment of current-voltage characteristics of a clamp device of a resistance based memory is depicted and generally designated 300. The clamp device may be a clamp transistor, such as the clamp transistors 134 or 144 depicted in FIG. 1. A first curve 302 represents a current through the clamp transistor when a resistance based memory element is in a logic "zero" state, such as a current through R0 136 or R0 116, and a second curve 304 represents a current through the clamp transistor when a resistance based memory element is in a logic "one" state, such as a current through R1 146 or R1 126.

In a particular embodiment, a resistance based memory element consists of a resistance and an access transistor. The access transistor can be modeled as a resistance, $R_{on\_accessTR}$, if the access transistor operates in the linear region. Thus, an access transistor characteristic can be combined with resistance characteristic. For example, referring to FIG. 4, a diagram of a particular illustrative embodiment of current-voltage characteristics of a combined resistance and access transistor is depicted and generally designated 400. A first line 402 represents a current though the resistance based memory element in a logic "zero" state, and a second line 404 represents a current though the resistance based memory element in a logic "one" state.

Figure 4:
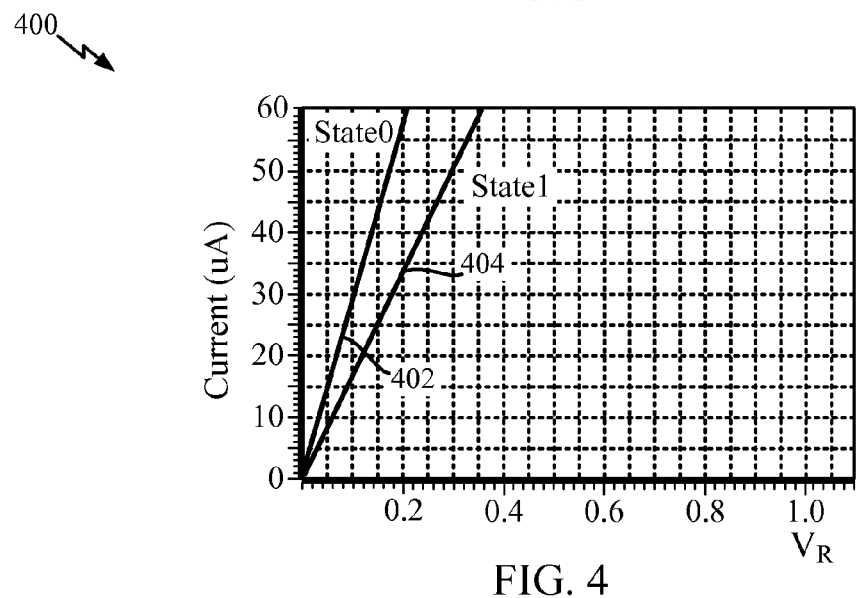
FIG. 4 is a diagram of a particular illustrative embodiment of current-voltage characteristics of a combined resistance and access transistor.
Figure 5:
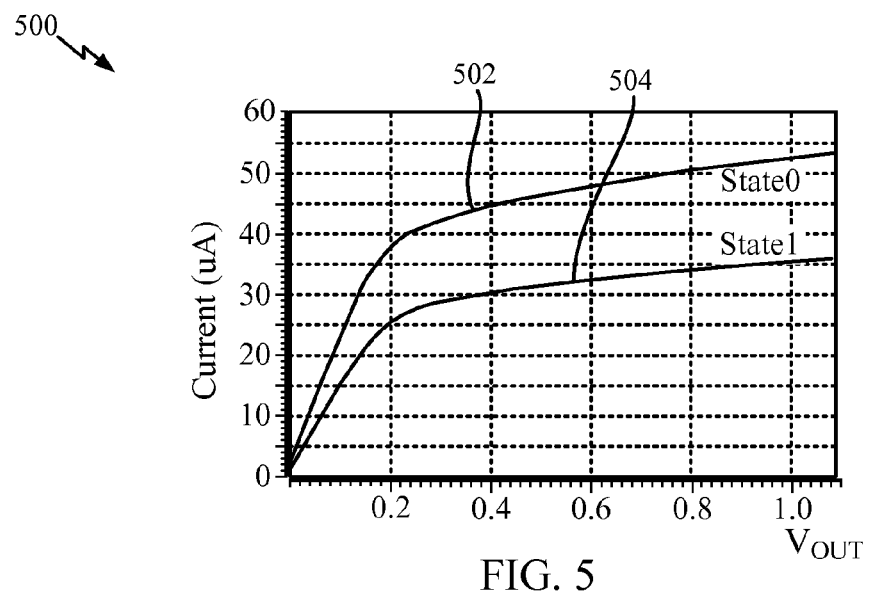
FIG. 5 is a diagram of a particular illustrative embodiment of current-voltage characteristics of the clamp device of FIG. 3 serially coupled to the resistance based memory element of FIG. 4.

Referring to FIG. 5, a diagram of a particular illustrative embodiment of current-voltage characteristics of a clamp device having characteristics depicted in FIG. 3 serially coupled to a resistance based memory element having characteristics depicted in FIG. 4 is depicted and generally designated 500. A first curve 502 represents a current, such as I0 or Iref0 of FIG. 1, through the clamp transistor and the resistance based memory element in a logic "zero" state, without the PMOS load 132 or 112 of FIG. 1. A second curve 504 represents a current, such as I1 or Iref1 of FIG. 1, though the clamp transistor and the resistance based memory element in a logic "one" state, without the PMOS load 142 or 122 of FIG. 1. Both the first and the second curve 502 and 504 exhibit a steep linear region at low voltages and a relatively flat saturation region at larger voltages.

Generally, in a system exhibiting the behavior depicted in FIG. 5, such as the memory 100 of FIG. 1, a signal margin $\Delta V$ may be increased by (1) reducing the slope of the first and second curves 502 and 504 in the saturation region, (2) increasing a difference between the current represented by the first curve 502 and the current represented by the second curve 504 in the saturation region, and (3) increasing a size of the saturation region of the first and second curves 502 and 504.

The slope of the first and second curves 502 and 504 in the saturation region may be reduced by decreasing a gate-source voltage ($V_{GS\_clamp}$) of the clamp transistor since slope $\propto 1/r_o \propto I \propto V_G$. Using the clamp transistor 144 of FIG. 1 as an illustrative example, $$V_{GS\_clamp} = V_{Clamp} - V_{BL} = V_{Clamp} - I(R_{MTJ} + R_{on\_accessTR})$$

where $V_{BL}$ is a voltage at a node BL_data1 coupled to the source terminal of the clamp transistor 144 and to the resistance R1 146, I is a current through the resistance R1 146, $R_{MTJ}$ is the resistance R1 146 where the resistance based memory device is a magnetic tunneling junction (MTJ) device, and $R_{on\_accessTR}$ represents a resistance of the access transistor 148. $V_{GS\_clamp}$ decreases with increasing $R_{MTJ}$.

The slope of the first and second curves 502 and 504 in the saturation region may also be reduced by decreasing a size (W) and a gate voltage ($V_G$) of the clamp transistor to increase an output resistance $r_o \propto 1/I \propto 1/W$.

The difference between the current represented by the first curve 502 and the current represented by the second curve 504 in the saturation region ($\Delta I$) may be increased by adjusting a value of the memory element (for example, $R_{MTJ}$) to be closer to an optimal value $R_{opt}$. A difference between the current represented by the first curve 502 and the current represented by the second curve 504 in the saturation region may be increased by increasing a size (W) and a gate voltage ($V_G$) of the clamp transistor.

The saturation region of the first and second curves 502 and 504 may be increased by decreasing a gate voltage ($V_G$) of the clamp transistor and increasing a size (W) of the clamp transistor to keep current (I) unchanged:

$$(V_{GS} - Vt)^\alpha \approx I/W, V_G - V_t < V_D$$

where $V_G$ is a gate voltage of the clamp transistor, Vt is a threshold voltage of the clamp transistor, and $V_D$ is a drain voltage of the clamp transistor.

Therefore, the signal margin $\Delta V$ may be adjusted by varying $R_{MTJ}$, as well as the width W and gate voltage $V_G$ of the clamp transistor. As $R_{MTJ}$ increases, the signal margin $\Delta V$ also increases. However, when $R_{MTJ}$ increases beyond a certain value $R_{opt}$, an output resistance of the clamp transistor and a load transistor (such as the PMOS load 142 of FIG. 1) increases, but the saturation region current difference $\Delta I$ decreases. Thus, the signal margin $\Delta V$ increases with $R_{MTJ}$ but is saturated for large $R_{MTJ}$.

The size and gate voltage for the clamp transistor also affect the signal margin $\Delta V$: small size and low voltage results in a large output impedance, reducing a slope in the saturation region; large size and high voltage increases the saturation region current difference $\Delta I$; and large size and low voltage results in a large saturation region.

Figure 6:
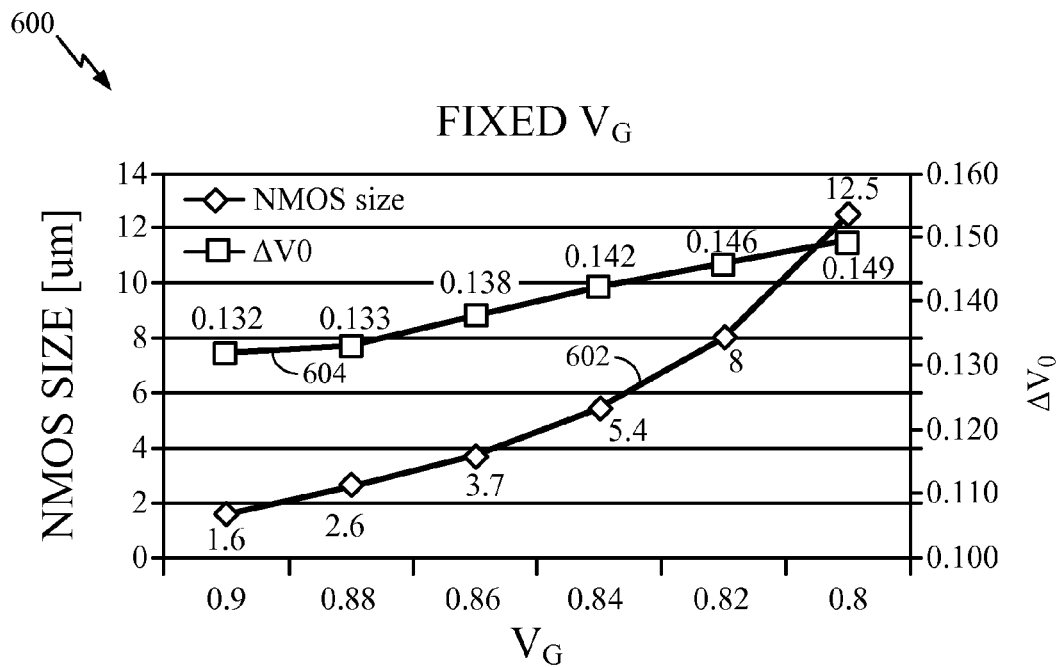
FIG. 6 is a diagram of a particular illustrative embodiment of characteristics of a resistance based memory with a varying gate voltage of a clamp device.
Figure 7:
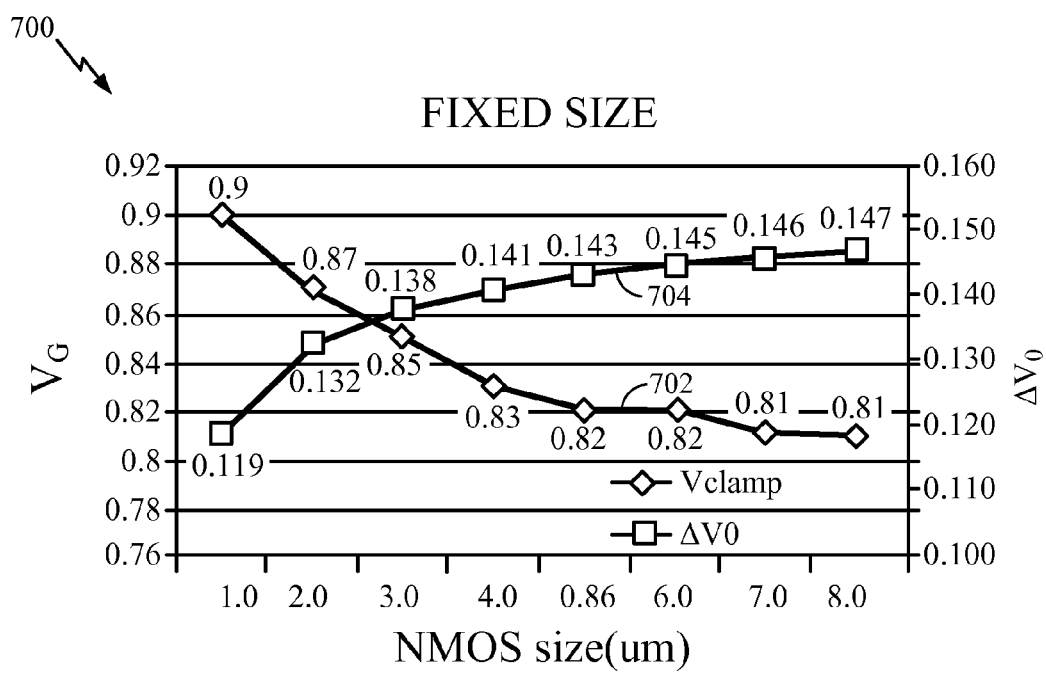
FIG. 7 is a diagram of a particular illustrative embodiment of characteristics of a resistance based memory with a varying size of a clamp device.

FIGS. 6 and 7 illustrate effects of clamp transistor width and gate voltage of a clamp transistor on the signal margin $\Delta V$. Referring to FIG. 6, a diagram of a particular illustrative embodiment of characteristics of a resistance based memory with a varying gate voltage $V_G$ of a clamp device is depicted and generally designated 600. A first curve 602 represents a size of a clamp device to maximize a voltage difference $\Delta V_0$ between a reference and a logic "zero" state of a resistance based memory element. The size of the clamp device is illustrated at the left axis as a width of a NMOS clamp transistor such as the clamp transistor 144 of FIG. 1. A second curve 604 represents the voltage difference $\Delta V_0$. The voltage difference $\Delta V_0$ is illustrated at the right axis as a voltage difference between the out_data0 node 162 and the out_ref node 160 of FIG. 1.

FIG. 6 depicts, for each given value of the gate voltage $V_G$, a maximum simulated voltage difference $\Delta V_0$ attained by varying clamp size, and the particular clamp size that resulted in the maximum simulated $\Delta V_0$. Values of the maximum simulated voltage difference $\Delta V_0$ over a range of values of the gate voltage $V_G$ are interpolated as the second curve 604, and values of the clamp size that resulted in the maximum simulated $\Delta V_0$ are interpolated as the first curve 602.

Similarly, FIG. 7 depicts a diagram 700 of a particular illustrative embodiment of characteristics of a resistance based memory with a varying size of a clamp device. A first curve 702 represents a gate voltage $V_G$ of a clamp device to maximize a voltage difference $\Delta V_0$ between a reference and a logic "zero" state of a resistance based memory element. The gate voltage $V_G$ is illustrated at the left axis as a gate voltage of an NMOS clamp transistor such as the clamp transistor 144 of FIG. 1. A second curve 704 represents the voltage difference $\Delta V_0$. The voltage difference $\Delta V_0$ is illustrated at the right axis as a voltage difference between the out_ref node 160 and the out_data0 node 162 of FIG. 1.

FIG. 7 depicts, for each given value of a clamp transistor width, a maximum simulated $\Delta V_0$ attained by varying a clamp gate voltage $V_G$, and the gate voltage that resulted in the maximum simulated $\Delta V_0$. Values of the maximum simulated voltage difference $\Delta V_0$ over a range of clamp sizes are interpolated as the second curve 704, and values of the gate voltage $V_G$ of the clamp transistor that resulted in the maximum simulated $\Delta V_0$ are interpolated as the first curve 702. For comparison purposes, simulated data represented in FIG. 6 was generated using the same circuit parameters as the simulated data represented in FIG. 7, except as noted above.

Comparing values of the first curve 602 of FIG. 6 (clamp size producing maximum $\Delta V_0$) to corresponding clamp sizes in FIG. 7 illustrates that, for a particular clamp size, a maximum simulated $\Delta V_0$ in FIG. 6 may be approximately equal to a maximum simulated $\Delta V_0$ in FIG. 7. For example, a clamp size of 2.6 um corresponds to $\Delta V_0$ of 0.133 in FIG. 6 (at $V_G$=0.88V), while a clamp size of 2.6 um corresponds to $\Delta V_0$ of approximately 0.135 in FIG. 7. Similarly, a clamp size of 3.7 um corresponds to $\Delta V_0$ of 0.138 in FIG. 6 (at $V_G$=0.86V), while a clamp size of 3.7 um corresponds to $\Delta V_0$ of approximately 0.139 in FIG. 7, and a clamp size of 5.4 um corresponds to $\Delta V_0$ of 0.142 in FIG. 6 (at $V_G$=0.84V), while a clamp size of 5.4 um corresponds to $\Delta V_0$ of approximately 0.144 in FIG. 7.

Because both methods of adjusting parameters to achieve a substantially maximum signal voltage difference $\Delta V_0$ depicted in FIGS. 6 and 7 may provide similar results, a preference of parameter adjustment may be determined based on additional criteria. For example, a constraint on the clamp size may generally be harder than a constraint on the clamp gate voltage $V_G$. In addition, controlling the clamp gate voltage $V_G$ may achieve a higher signal margin during parameter adjustment when a current of a logical "one" state exceeds a current threshold. Thus, determining the clamp gate voltage $V_G$ to substantially maximize the signal margin $\Delta V$ with a fixed clamp size is generally preferred.

Figure 8:
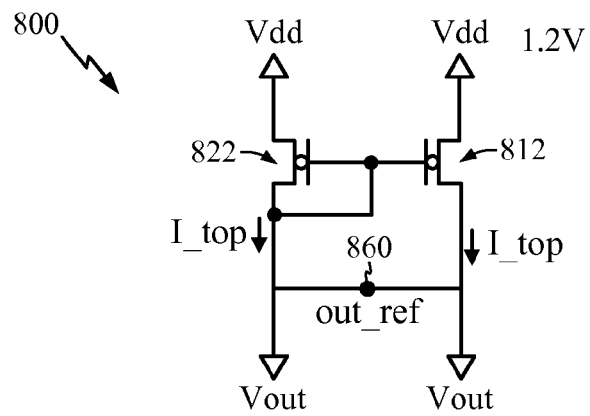
FIG. 8 is a circuit diagram of a particular illustrative embodiment of a load portion of a circuit associated with a reference cell of a resistance based memory device.

Referring to FIG. 8, a diagram of a particular illustrative embodiment of a load portion of a circuit associated with a reference cell of a resistance based memory device is depicted and generally designated 800. The load portion includes a first PMOS transistor 812 that has a first terminal coupled to a supply Vdd and a second terminal coupled to a reference (out_ref) node 860. A second PMOS transistor 822 has a first terminal coupled to the supply Vdd and a second terminal coupled to the out_ref node 860. A gate terminal of each of the first PMOS transistors 812 and 822 is coupled to the reference output node (out_ref) 860. In an illustrative embodiment, the PMOS transistors 812 and 822 and the out_ref node 860 may correspond to the PMOS load devices 112 and 122 and to the out_ref node 160, respectively, depicted in FIG. 1. Operation of the load portion 800 is illustrated in the load-line diagrams of FIGS. 9-10.

Figure 9A:
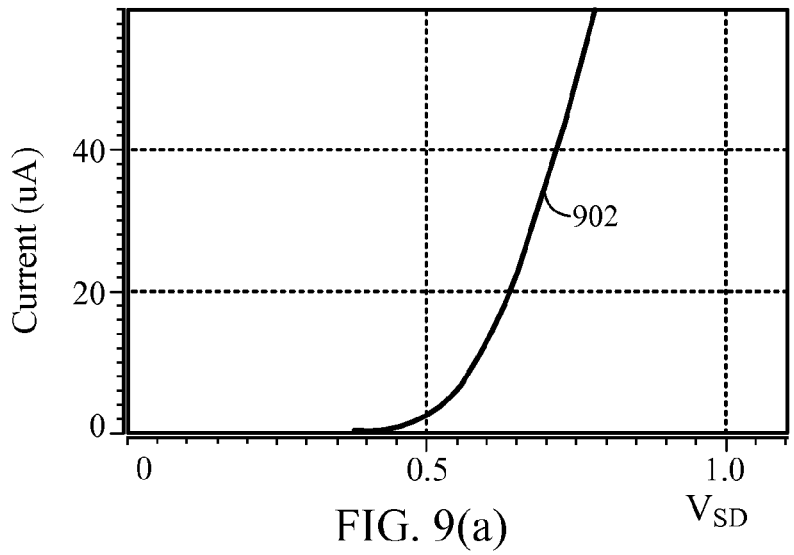
Figure 9B:
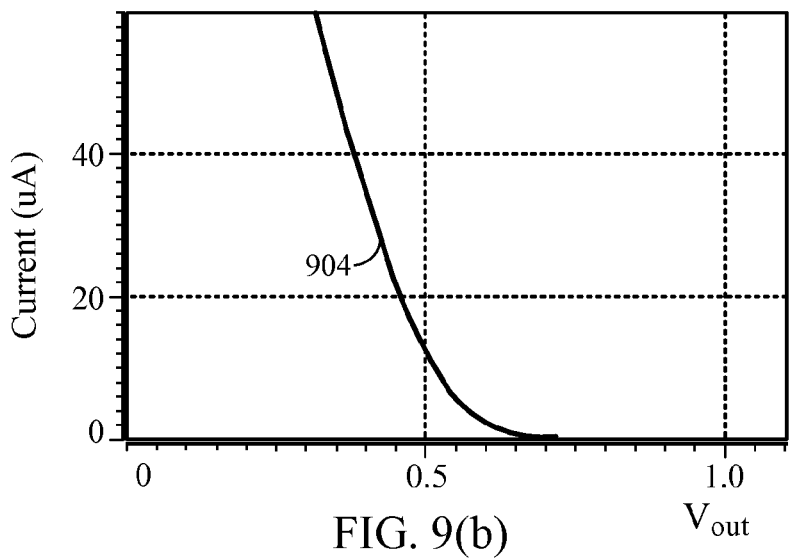

Referring to FIG. 9, diagrams of a particular illustrative embodiment of current-voltage characteristics of a load device portion of a circuit associated with a reference cell of a resistance based memory device are depicted. FIG. 9(a) includes a curve 902 that depicts a diode-like behavior of a current I_top through the PMOS transistors 812 and 822 of FIG. 8 as a function of source-to-drain voltage, $V_{SD}=V_{dd}-V_{out}$, where $V_{out}$ is a voltage of the out_ref node 860. FIG. 9(b) depicts a curve 904 corresponding to the current through the PMOS transistors 812 and 822 of FIG. 8 as a function of $V_{out}=V_{dd}-V_{SD}$. In a particular embodiment, I_top corresponds to Iref of FIG. 1.

Referring to FIG. 10, a particular illustrative embodiment of a load line characteristic of the reference circuit 102 of FIG. 1 graphically illustrates an operating point of the reference circuit 102. A first curve 1002 illustrates a first reference current Iref0 through the logic "zero" reference path 110 including the access transistor 118, the memory element 116, and the clamp transistor 114, of FIG. 1 without the PMOS load 112. A second curve 1004 illustrates a second reference current Iref1 through the logic "one" reference path 120 including the access transistor 128, the memory element 126, and the clamp transistor 124, of FIG. 1 without the PMOS load 122. In a particular embodiment, the first curve 1002 and the second curve 1004 correspond to the curves 502 and 504 of FIG. 5, respectively. A third curve 1006 illustrates an arithmetic mean of Iref0 and Iref1, given as (Iref0+Iref1)/2. A fourth curve 1008 corresponds to the curve 904 of FIG. 9(b) and illustrates the current Iref through the PMOS load 122 or 112 as a function of a voltage at the out_ref node 160 (Vout).

Applying Kirchhoff's Current Law at the out_ref node 160 of FIG. 1, the sum of a current Iref through the PMOS load 112 and the current Iref through the PMOS load 122 equals the sum of first reference current Iref0 and the second reference current Iref1, so that Iref=½(Iref1+Iref2). Thus, an intersection 1010 of the third curve 1006 and the fourth curve 1008 indicates an operating point the reference circuit 102 of FIG. 1.

Referring to FIG. 11, a diagram of a particular illustrative embodiment of a load portion of a circuit associated with a data cell of a resistance based memory device is depicted and generally designated 1100. The load portion includes a first PMOS transistor 1112 that has a first terminal coupled to a supply Vdd and a second terminal coupled to a data output (out_data0) node 1162. A second PMOS transistor 1122 has a first terminal coupled to the supply Vdd and a second terminal coupled a data output (out_data0) node 1164. A gate terminal of each of the first PMOS transistors 1112 and 1122 is coupled to a reference output node (out_ref). In an illustrative embodiment, the PMOS transistors 1112 and 1122 and correspond to PMOS load devices 132 and 142 of the bit-zero data path 130 and the bit-one data path 140 of FIG. 1, respectively, and the out_data0 node 1162 and the out_data1 node 1164 correspond to the nodes 162 and 164 of FIG. 1, respectively. The reference output node (out_ref) may be provided by a reference circuit, such as the out_ref node 160 of FIG. 1, as graphically illustrated in FIG. 10. Operation of the load portion 1100 is illustrated in the load-line diagrams of FIGS. 12-14.

Figure 12A:
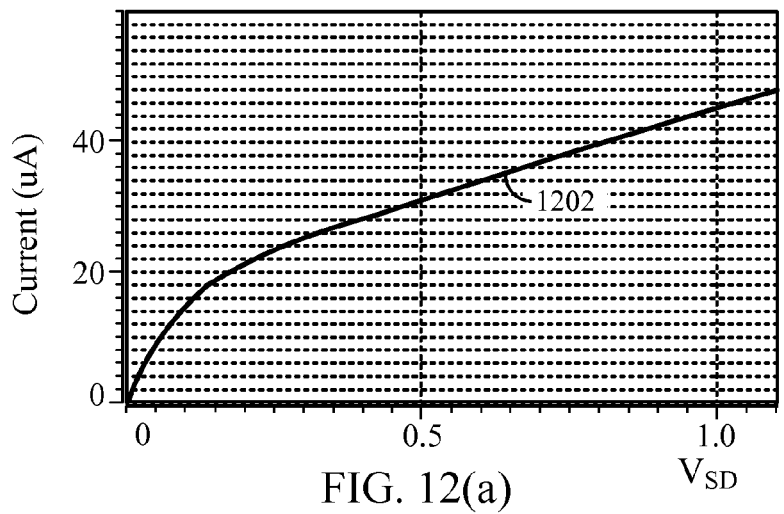
Figure 12B:
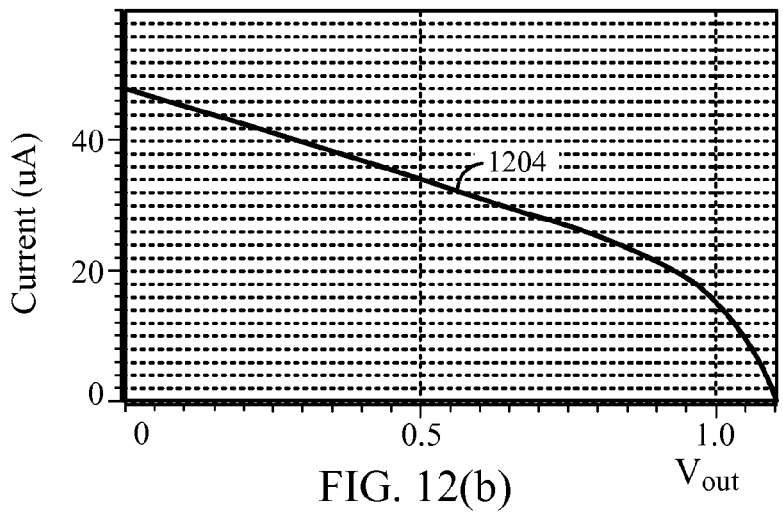

Referring to FIG. 12, diagrams of a particular illustrative embodiment of current-voltage characteristics of a load device portion of a circuit associated with a data cell of a resistance based memory device are depicted and generally designated 1200. FIG. 12(a) includes a curve 1202 that depicts a current-voltage characteristic of the PMOS transistors 1112 or 1122 of FIG. 11 as a function of source-to-drain voltage, $V_{SD}=V_{dd}-V_{out}$, where $V_{out}$ is a voltage at the out_data0 node 1162 or the out_data1 node 1164, respectively. FIG. 12(b) depicts a curve 1204 corresponding to the current through the PMOS transistor 1112 or 1122 of FIG. 11 as a function of $V_{out}=V_{dd}-V_{SD}$.

Referring to FIG. 13, a particular illustrative embodiment of load line characteristics graphically illustrate operating points of the bit-zero path 130 and the bit-one path 140 of FIG. 1. A first curve 1302 illustrates a first current I0 through the bit-zero path 130 including the access transistor 138, the memory element 136, and the clamp transistor 134, of FIG. 1 without the PMOS load 132. A second curve 1304 illustrates a second current I1 through the bit-one path 140 including the access transistor 148, the memory element 146, and the clamp transistor 144 of FIG. 1 without the PMOS load 142. In a particular embodiment, the first curve 1302 and the second curve 1304 correspond to the curves 502 and 504 of FIG. 5, respectively. A third curve 1306 corresponds to the curve 1204 of FIG. 12(b) and illustrates current through the PMOS load 132 or 142 of FIG. 1 as a function of a voltage Vout at the out_data0 node 162 or out_data1 node 164, respectively.

A first intersection 1310 of the first curve 1302 and the third curve 1306 indicates an operating point when a logic "zero" value is stored at a resistance based memory element, such as an operating point of the bit-zero path 130 of FIG. 1. A second intersection 1320 of the second curve 1304 and the third curve 1306 indicates an operating point when a logic "one" value is stored at a resistance based memory element, such as an operating point of the bit-one path 140 of FIG. 1.

FIG. 14 graphically depicts operational parameters associated with the load line characteristics of FIGS. 10 and 13. A first curve 1402 illustrates a first current I0 through the bit-zero path 130 or Iref0 through the first reference path 110 of FIG. 1, including the access transistor 138 or 118, the memory element 136 or 116, and the clamp transistor 134 or 114, without the PMOS load 132 or 112, respectively, referred to as 'logic "zero" bottom-side circuit.' A second curve 1404 illustrates a second current I1 through the bit-one path 140 or Iref1 through the second reference path 120, including the access transistor 148 or 128, the memory element 146 or 126, and the clamp transistor 144 of 124 without the PMOS load 142 or 122, referred to as 'logic "one" bottom-side circuit.'

A third curve 1406 illustrates current through the PMOS load 132 or 142 as a function of a voltage at the out_data0 node 162 or out_data1 node 164, respectively, referred to as the "top-side data circuit." A fourth curve 1408 illustrates a current Iref through the PMOS load 112 or 122 of the reference circuit 102 of FIG. 1, referred to as the "top-side reference circuit," as a function of a voltage at the out_ref node 160, and in a particular embodiment may correspond to the curve 904 of FIG. 9(b).

A first intersection 1410 of the first curve 1402 and the third curve 1406 indicates a voltage (Vout_data0 1414) at the out_data0 node 162 and a current (I0 1412) corresponding to an operating point of the bit-zero path 130 of FIG. 1. A second intersection 1420 of the second curve 1404 and the third curve 1406 indicates a voltage (Vout_data1 1424) at the out_data1 node 164 and a current (I1 1422) corresponding to an operating point of the bit-one path 140 of FIG. 1. A third intersection 1430 of the third curve 1406 and the fourth curve 1408 indicates a voltage (Vout_ref 1434) at the out_ref node 160 and a current (Iref 1432) at an operating point of the reference circuit 102. The operating point of the reference circuit 102 indicated by the third intersection 1430 is equivalent to the operating point determined by the technique discussed with respect to FIG. 10.

A voltage difference $\Delta V_0$ between the voltage at the out_ref node 160 (Vout_ref) and the voltage at the out_data0 node 162 (Vout_data0) indicates a tolerance of the memory 100 to noise or to process variation in detecting a logic "zero" value stored at a resistance based memory element. A voltage difference $\Delta V_1$ between the voltage at the out_data1 node 164 (Vout_data1) and the voltage at the out_ref node 160 (Vout_ref) indicates a tolerance of the memory 100 to noise or to process variation in detecting a logic "one" value stored at a resistance based memory element. The signal margin of the memory 100 is equal to $\Delta V_0$, as the smaller of $\Delta V_0$ and $\Delta V_1$. Similarly, current differences $\Delta I_0$ and $\Delta I_1$ correspond to differences between Iref and I0, and I1 and Iref, respectively.

Referring to FIG. 15, a diagram of a first particular illustrative embodiment of characteristics of the memory 100 of FIG. 1 is depicted and generally designated 1500. A first curve 1502 and a second curve 1504 illustrate current-voltage (I-V) characteristics for the logic "zero" bottom-side circuit and the logic "one" bottom-side circuit, respectively. A first set of load lines 1520 and 1522 correspond to I-V characteristics of the top-side reference circuit and the top-side data circuit, respectively, with a first width of the PMOS transistors 112, 122, 132, and 142. A second set of load lines 1540 and 1542 correspond to I-V characteristics of the top-side reference circuit and the top-side data circuit, respectively, where the PMOS transistors 112, 122, 132, and 142 have a second width that is larger than the first width.

The first set of load lines 1520 and 1522 demonstrate that the PMOS transistors having the first width restrict current so that the clamp devices operate in the linear region, resulting in an undesirably small $\Delta V$. The second set of load lines 1540 and 1542 demonstrate that the PMOS transistors having the second width allow enough current to flow to enable both of the clamp devices to operate in the saturation region. An intersection 1550 of the load lines 1540 and 1542 indicates a voltage at the out_ref node 160 of FIG. 1. An intersection 1552 of the load line 1540 and the first curve 1502 indicates a bit "zero" output voltage, and an intersection 1554 of the load line 1540 and the second curve 1504 indicates a bit "one" output voltage. Both of the intersections 1552 and 1554 indicate that the clamp devices are operating in the saturation region, although the intersection 1552 corresponding to the bit "zero" state is within, but at the margin of, the saturation region.

Referring to FIG. 16, a diagram of a second particular illustrative embodiment of characteristics of the memory 100 of FIG. 1 is depicted and generally designated 1600. A first curve 1602 and a second curve 1604 illustrate current-voltage (I-V) characteristics for the logic "zero" bottom-side circuit and the logic "one" bottom-side circuit, respectively. Load lines 1640 and 1642 correspond to I-V characteristics of the top-side reference circuit and the top-side data circuit, respectively. An intersection 1650 of the load lines 1640 and 1642 indicates a voltage at the out_ref node 160. An intersection 1652 of the load line 1640 and first curve 1602 indicates a bit "zero" output voltage, and an intersection 1654 of the load line 1640 and the second curve 1604 indicates a bit "one" output voltage. Both of the intersections 1652 and 1654 indicate that the clamp devices are operating in the saturation region. However, the PMOS load has a lowered output resistance $r_0$ than as illustrated in FIG. 15, as demonstrated by a slope of the load line 1640.

FIGS. 17-19 illustrate a particular illustrative embodiment of an operation of a resistance based memory having a logic "one" current exceeding a current threshold (FIG. 17), and the resistance based memory after the logic "one" current has been reduced by reducing a gate voltage of a clamp transistor (FIG. 18) or by reducing a width of the clamp transistor (FIG. 19), and the corresponding signal margins that result.

Referring to FIG. 17, a diagram of a particular illustrative embodiment of characteristics of a resistance based memory device having a current exceeding a threshold value is depicted and generally designated 1700. A first curve 1702 and a second curve 1704 illustrate current-voltage (I-V) characteristics for the logic "zero" bottom-side circuit and the logic "one" bottom-side circuit, respectively. Load lines 1740 and 1742 correspond to I-V characteristics of the top-side reference circuit and the top-side data circuit, respectively. A region 1750 generally indicates the operating point of the bit-one data path 140. In a particular embodiment, a current associated with the logic "one" state ($I_1$) has a value of approximately nineteen microamps (uA), exceeding a threshold current of fifteen uA as an illustrative, non-limiting example of a threshold current. The threshold current $I_{max}$ may indicate a maximum allowed current to prevent invalid write commands during read operations.

The voltage difference $\Delta V_0$ between the intersection of the load lines 1740 and 1742 and the intersection of the first curve 1702 and the load line 1740 is approximately 267 millivolts (mV). The voltage difference $\Delta V_1$ between the intersection of the first curve 1702 and the load line 1740 and the intersection of the load lines 1740 and 1742 is approximately 298 millivolts (mV). The signal margin, determined as the lesser of $\Delta V_0$ and $\Delta V_1$, is thus given by $\Delta V_0$ and has a value 267 mV.

Referring to FIG. 18, a diagram of a particular illustrative embodiment of characteristics of the resistance based memory device of FIG. 17 having a reduced gate voltage of a clamp device is depicted and generally designated 1800. Starting from the embodiment of FIG. 17, to reduce current in the bit "one" state to a value less than or equal to Imax (15 uA), a gate voltage $V_G$ of a clamp device is first reduced, after which a width of the PMOS transistors 112, 122, 132 and 142 is reduced to achieve a substantially maximal value of $\Delta V_0$ of 262 mV at a bit "one" current of fifteen uA. As illustrated, $\Delta V_1$ is 297 mV, and the signal margin is thus given by $\Delta V_0$ and has a value 267 mV.

Referring to FIG. 19, a diagram of a particular illustrative embodiment of characteristics of the resistance based memory device of FIG. 17 with a reduced width of a clamp device is depicted and generally designated 1900. Starting from the embodiment of FIG. 17, to reduce current in the bit "one" state to a value less than or equal to $I_{max}$ (15 uA), a width of the clamp device is first reduced, after which a width of the PMOS transistors 112, 122, 132, and 142 is reduced to achieve a substantially maximal value of $\Delta V_0$ of 241 mV at a bit "one" current of fifteen uA. As illustrated, the value of $\Delta V_1$ is 274 mV, and the signal margin is thus given by $\Delta V_0$ and has a value of 241 mV. The signal margin of FIG. 19 is smaller, and thus less desirable, than the signal margin of FIG. 18, primarily because a larger saturation region results from reducing $V_G$ to lower $I_1$ to $I_{max}$ than from reducing clamp size to lower $I_1$ to $I_{max}$.

As illustrated in FIGS. 3-19, parameters of a resistance based memory such as the memory 100 of FIG. 1 may be selectively adjusted in a manner designed to produce a largest achievable signal margin, given as the smaller of $\Delta V_0$ and $\Delta V_1$. Other considerations in determining device parameters include the recognition that a large resistance of the memory element causes a high current density. In addition, a maximum data 1 read current should be low enough to prevent invalid data writing during a read operation, and a bitline voltage should not exceed a threshold bitline voltage ($V_{BLmax}$) to maintain reasonable values of a magnetic resistance (MR) ratio.

Referring to FIG. 20, a flow diagram of a first particular embodiment of a method of determining a set of parameters of a resistance based memory circuit is depicted and generally designated 2000. As illustrative examples, the resistance based memory circuit may include a magnetoresistive random access memory (MRAM), a phase-change random access memory (PRAM), a spin torque transfer MRAM (STT-MRAM), or other resistance based memory devices.

At 2002, a first parameter is selected based on a first predetermined design constraint of the resistance based memory circuit. Moving to 2004, a second parameter is selected based on a second predetermined design constraint of the resistance based memory circuit. In a particular embodiment, the first predetermined design constraint may include a process parameter, such as a resistance value associated with a resistance-based memory element. Process design constraints may not be variable or may be difficult to satisfy because the process parameter may be fixed or less flexible than circuit design parameters. The second parameter may include a circuit design parameter such as a maximum device size, or a maximum transistor width due to a physical spacing limit. For example, a maximum transistor size of a sense amplifier portion may be limited due to a bitline-to-input/output multiplexer scheme.

Continuing to 2006, an iterative methodology is performed to adjust at least one circuit parameter of a sense amplifier portion of the resistance based memory circuit by selectively assigning and adjusting a physical property of the at least one circuit parameter to achieve a desired sense amplifier margin value without changing the first parameter and the second parameter. Physical properties that may be adjusted include transistor dimensions and gate bias voltages, as illustrative examples. In a particular embodiment, performing the iterative methodology includes adjusting the physical property to increase a sense amplifier margin at 2008. The desired sense amplifier margin may be a predetermined margin value, or may be a substantially maximum amplifier signal margin given the first and second predetermined design constraints.

The circuit design parameter may include a width of a load transistor that is coupled to operate as a load. For example, the circuit design parameter may include a width of the load devices 112, 122, 132, and 134 depicted in FIG. 1. The circuit design parameter may include a gate voltage of a clamp transistor within the sense amplifier portion of the memory circuit. For example, the circuit design parameter may include a value of Vclamp depicted in FIG. 1.

The clamp transistor may operate in a saturation mode and may limit a current in a data read path of a magnetic tunnel junction (MTJ) element of the resistance based memory circuit. In a particular embodiment, the reference cell includes a p-channel metal oxide semiconductor (PMOS) field effect transistor load coupled to the clamp transistor. The MTJ element may be coupled to the clamp transistor and further coupled to an access transistor. The resistance based memory circuit may further include a data cell having a second PMOS load, a second clamp transistor, a second MTJ element, and a second access transistor, such as the data paths 130 and 140 of FIG. 1.

Referring to FIG. 21, a diagram of a second particular embodiment of a method of determining a set of parameters of a resistance based memory circuit is depicted and generally designated 2100. A value of a resistance $R_{MTJ}$ of a magnetic tunnel junction memory element is set to a predetermined value $R_{MTJ\_opt}$, at 1502. In a particular embodiment, $R_{MTJ\_opt}$ is the optimal R0 value to maximize the signal margin. At 2104, a width of a clamp transistor $W_{nclamp}$ of a spin torque transfer magnetoresistive random access memory (STT-MRAM) is set to a value $W_{nclamp\_max}$. $W_{nclamp\_max}$ may be a predetermined design constraint that is selected to be substantially a largest width that satisfies a spacing limit of the STT-MRAM. For example, the spacing limit may be determined by a bitline-to-input/output multiplexing scheme of the STT-MRAM, such as 4:1 or 8:1, which limits a transistor width of a sense amplifier portion of the STT-MRAM. A signal margin $\Delta V_0$ may increase and saturate with an increase of the width of the clamp transistor, such as illustrated in FIG. 7, and the width of the clamp transistor may be selected based on the signal margin and an area limitation.

In addition, other parameters may be selected or otherwise determined based on predetermined constraints, such as a resistance $R_{MTJ}$ of a magnetic tunnel junction (MTJ) of the STT-MRAM at a bit-zero state, a maximum read current $I_{max}$ to prevent changing a bit-one state to a bit-zero state during a read operation of the bit-one state, other process and circuit design parameters, or any combination thereof. In a particular example, one or more selected parameters may include process parameters determined by process technology, such as the resistance of the MTJ.

After the parameters are selected, an iterative methodology begins. The iterative methodology generally includes adjusting at least one circuit design parameter of the sense amplifier portion of the STT-MRAM by selectively adjusting a physical property of the at least one circuit design parameter to achieve a desired sense amplifier margin value, but without changing the previously determined parameters such as $R_{MTJ}$ or $W_{nload}$ affected by design constraints. Moving to 2106, initial values of a gate voltage $V_G$ of the clamp transistor and a width $W_{pload}$ of a load transistor are determined to substantially maximize a signal margin $\Delta V$ of the STT-MRAM.

Continuing to 2108, a bit-one state current (I) of the MTJ is compared to the predetermined current threshold $I_{max}$ and a voltage ($V_{BL}$) of the bitline is compared to a predetermined voltage threshold $V_{BLmax}$. At decision 2110, a determination is made whether the bit-one state current I is less than $I_{max}$ and $V_{BL}$ is less than $V_{BLmax}$. When $I<I_{max}$ and $V_{BL}<V_{BLmax}$, the method terminates at 2116. When I exceeds $I_{max}$ or $V_{BL}$ exceeds $V_{BLmax}$, processing advances to 2112 to begin iteratively reducing the gate voltage $V_G$ of the clamp transistor and determining the width $W_{pload}$ of the load transistor that results in a substantially maximum sense amplifier margin given the gate voltage $V_G$. In the illustrative embodiment depicted in FIG. 21, in the case where I is equal to $I_{max}$ or $V_{BL}$ is equal to $V_{BLmax}$, processing also advances to 2112, although in another embodiment processing may instead advance to 2116, where the method terminates.

At 2112, the gate voltage $V_G$ is reduced. $V_G$ may be reduced by a predetermined amount or a calculated step size. After reducing $V_G$, at 2114, a next value of $W_{pload}$ is determined to substantially maximize $\Delta V_0$. Processing returns to 2108, where I and $V_{BL}$ are calculated using the values determined at 2112 and 2114.

The general dependence of $\Delta V_0$ on $W_{nclamp}$ and $V_G$ illustrated in FIGS. 17-19 suggests that reducing the current I while maintaining a largest possible signal margin, given as the smaller of $\Delta V_0$ and $\Delta V_1$, may be achieved by setting a largest reasonable $W_{nclamp}$ and by iteratively reducing $V_G$, and adjusting $W_{pload}$, until I is less than $I_{max}$. Circuit designs that are determined without following the design flows discussed with respect to FIGS. 1-21 may have local optimums in certain aspects, but may suffer from signal margin issues and low yields. At least a portion of the iterative methodology illustrated in FIGS. 20-21 may be performed by an automated design tool, such as described with respect to the system 200 of FIG. 2. One or more parameters, physical properties, or any combination thereof, may be assigned an initial value prior to performing the iterative methodology at the automated design tool, such as via the input device 230 or the data file 218 of FIG. 2. The design tool may perform the iterations to generate a circuit design that is substantially globally optimized for signal margin, given the accuracy of device models and simulation algorithms of the design tool, and other implementation factors such as step sizes and rounding errors.

Referring to FIG. 22, a block diagram of a particular illustrative embodiment of an electronic device including a resistance based memory circuit with parameters determined by an iterative methodology, as described herein, is depicted and generally designated 2200. The device 2200 includes a processor, such as a digital signal processor (DSP) 2210, coupled to a memory 2232 and also coupled to a resistance based memory circuit with parameters determined by an iterative methodology 2264. In an illustrative example, the resistance based memory circuit with parameters determined by the iterative methodology 2264 includes the memory depicted in FIG. 1 and has circuit parameters determined using one or more of the methods of FIGS. 20 and 21, using the device 202 of FIG. 2, or any combination thereof. In a particular embodiment, the resistance based memory circuit with parameters determined by the iterative methodology 2264 includes a spin torque transfer magnetoresistive random access memory (STT-MRAM) memory device.

FIG. 22 also shows a display controller 2226 that is coupled to the digital signal processor 2210 and to a display 2228. A coder/decoder (CODEC) 2234 can also be coupled to the digital signal processor 2210. A speaker 2236 and a microphone 2238 can be coupled to the CODEC 2234.

FIG. 22 also indicates that a wireless controller 2240 can be coupled to the digital signal processor 2210 and to a wireless antenna 2242. In a particular embodiment, the DSP 2210, the display controller 2226, the memory 2232, the CODEC 2234, the wireless controller 2240, and the resistance based memory circuit with parameters determined by the iterative methodology 2264 are included in a system-in-package or system-on-chip 2222. In a particular embodiment, an input device 2230 and a power supply 2244 are coupled to the on-chip system 2222. Moreover, in a particular embodiment, as illustrated in FIG. 22, the display 2228, the input device 2230, the speaker 2236, the microphone 2238, the wireless antenna 2242, and the power supply 2244 are external to the on-chip system 2222. However, each can be coupled to a component of the on-chip system 2222, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A processor implemented method of determining a set of parameters of a resistance based memory circuit, the method comprising:

using a processor, receiving a selection of a first parameter based on a first design constraint of the resistance based memory circuit;

receiving a selection of a second parameter based on a second design constraint of the resistance based memory circuit; and performing an iterative methodology to adjust at least one circuit parameter of a sense amplifier portion of the resistance based memory circuit by selectively assigning and adjusting a physical property of the at least one circuit parameter to achieve a desired sense amplifier margin value without changing the first parameter or the second parameter, wherein the at least one circuit parameter includes a gate voltage of a clamp transistor of a reference circuit within the sense amplifier portion.

2. The method of claim 1, wherein the resistance based memory circuit includes a magnetoresistive random access memory (MRAM), a phase-change random access memory (PRAM), or a spin torque transfer MRAM (STT-MRAM).

3. The method of claim 1, wherein the desired sense amplifier margin value is a substantially maximum amplifier signal margin given the first and second design constraints.

4. The method of claim 1, wherein performing the iterative methodology includes adjusting the physical property to increase a sense amplifier margin.

5. The method of claim 1, wherein the at least one circuit parameter includes a width of a load transistor that is coupled to operate as a reference resistance to or a load of the reference circuit.

6. The method of claim 1, wherein the clamp transistor operates in a saturation mode and provides a variable resistance in a data read path of a magnetic tunnel junction (MTJ) element of the resistance based memory circuit.

7. The method of claim 6, wherein the reference circuit includes a p-channel metal oxide semiconductor (PMOS) field effect transistor load coupled to the clamp transistor, wherein the MTJ element is coupled to the clamp transistor and further coupled to a write line transistor, and wherein the resistance based memory circuit further includes a data cell having a second PMOS load, a second clamp transistor, a second MTJ element, and a second write line transistor.

8. A processor implemented method of determining a set of parameters, the method comprising:
using a processor, selecting a first parameter based on a first design constraint of a spin torque transfer magnetoresistive random access memory (STT-MRAM);
selecting a second parameter based on a second design constraint of the STT-MRAM; and
performing an iterative methodology to adjust at least one circuit parameter of a sense amplifier portion of the STT-MRAM by selectively adjusting a physical property of the at least one circuit parameter to achieve a desired sense amplifier margin value but without changing the first parameter or the second parameter.

9. The method of claim 8, wherein the second design constraint includes a resistance of a magnetic tunnel junction (MTJ) of the STT-MRAM at a bit-zero state.

10. The method of claim 9, wherein the second design constraint includes a width of a clamp transistor of a reference circuit of the sense amplifier portion and wherein the width of the clamp transistor is selected to be substantially a largest width that satisfies a spacing limit of the STT-MRAM.

11. The method of claim 9, wherein the second design constraint includes a width of a clamp transistor of a reference circuit of the sense amplifier portion, wherein the resistance of the MTJ is a process parameter, wherein a signal margin increases and saturates with an increase of the width of the clamp transistor, and wherein the width of the clamp transistor is selected based on the signal margin and an area limitation.

12. The method of claim 9, wherein the second design constraint includes a width of a clamp transistor of a reference circuit of the sense amplifier portion and wherein performing the iterative methodology includes:
determining a value of a gate voltage of the clamp transistor and a width of a load transistor that results in a substantially maximum sense amplifier margin; and
comparing a bit-one state current of the MTJ to a current threshold.

13. The method of claim 12, wherein performing the iterative methodology further includes:
when the bit-one state current of the MTJ exceeds the current threshold, iteratively reducing the gate voltage of the clamp transistor and determining the width of the load transistor that results in a substantially maximum sense amplifier margin given the gate voltage.

14. The method of claim 13, wherein at least a portion of the iterative methodology is performed by an automated design tool and wherein the physical property is assigned an initial value prior to performing the iterative methodology.

15. A non-transitory processor readable medium having processor instructions that are executable to cause a processor to:
receive a first input of a first parameter based on a first design constraint of a resistance based memory circuit;
receive a second input of a second parameter based on a second design constraint of the resistance based memory circuit;
perform an iterative methodology to adjust at least one circuit parameter of a sense amplifier portion of the resistance based memory circuit by selectively adjusting a physical property of the at least one circuit parameter to achieve a desired sense amplifier margin value without changing the first parameter or the second parameter, wherein the first design constraint includes a width of a clamp transistor of a reference circuit of the sense amplifier portion; and
store a value associated with the physical property after the desired sense amplifier margin is achieved given the first and second design constraints.

16. The non-transitory processor readable medium of claim 15, wherein the processor executable instructions are further executable to:
determine an initial value of a gate voltage of a clamp transistor of the sense amplifier portion and an value of a width of a load transistor of the sense amplifier portion that result in a substantially maximum sense amplifier margin value given the first parameter and the second parameter.

17. The non-transitory processor readable medium of claim 16, wherein selectively adjusting the physical property further includes:
determining a current of the sense amplifier portion using the initial value of the gate voltage and the initial value of the width of the load transistor; and
comparing the current of the sense amplifier portion to a current threshold.

18. The non-transitory processor readable medium of claim 17, wherein selectively adjusting the physical property further includes, when the current exceeds the current threshold:
determining a reduced gate voltage;
determining a second width of the load transistor that results in a substantially maximum sense amplifier margin value given the first parameter, the second parameter, and the reduced gate voltage; and determining a revised current of the sense amplifier portion using the reduced gate voltage and the second width of the load transistor.

19. The non-transitory processor readable medium of claim 15, wherein the processor instructions are further executable to cause a processor to output a data file that represents a circuit design of the resistance based memory circuit having the desired sense amplifier margin.

20. The non-transitory processor readable medium of claim 15, wherein the processor instructions are compatible with a computer-aided design tool.

21. The method of claim 1, wherein the resistance based memory circuit includes a spin torque transfer magnetoresistive random access memory (STT-MRAM) and wherein the first design constraint includes a resistance of a magnetic tunnel junction (MTJ) of the STT-MRAM at a bit-zero state.

22. The method of claim 21, wherein the second design constraint includes a width of a clamp transistor of a reference circuit of the sense amplifier portion.

23. An apparatus comprising:
means for receiving a selection of a first parameter based on a first design constraint of a resistance based memory circuit;
means for receiving a selection of a second parameter based on a second design constraint of the resistance based memory circuit; and
means for performing an iterative methodology to adjust at least one circuit parameter of a sense amplifier portion of the resistance based memory circuit by selectively assigning and adjusting a physical property of the at least one circuit parameter to achieve a desired sense amplifier margin value without changing the first parameter or the second parameter, wherein the at least one circuit parameter includes a gate voltage of a clamp transistor of a reference circuit within the sense amplifier portion.

24. The apparatus of claim 23, wherein the resistance based memory circuit includes a magnetoresistive random access memory (MRAM), a phase-change random access memory (PRAM), or a spin torque transfer MRAM (STT-MRAM).

25. The apparatus of claim 23, wherein the desired sense amplifier margin value is a substantially maximum amplifier signal margin given the first and second design constraints.

26. The apparatus of claim 23, wherein performing the iterative methodology includes adjusting the physical property to increase a sense amplifier margin.

27. The apparatus of claim 23, wherein the at least one circuit parameter includes a width of a load transistor that is coupled to operate as a reference resistance to or a load of the reference circuit.

28. The apparatus of claim 23, wherein the clamp transistor operates in a saturation mode and provides a variable resistance in a data read path of a magnetic tunnel junction (MTJ) element of the resistance based memory circuit.

29. The apparatus of claim 28, wherein the reference circuit includes a p-channel metal oxide semiconductor (PMOS) field effect transistor load coupled to the clamp transistor, wherein the element is coupled to the clamp transistor and further coupled to a write line transistor, and wherein the resistance based memory circuit further includes a data cell having a second PMOS load, a second clamp transistor, a second MTJ element, and a second write line transistor.

30. The apparatus of claim 23, wherein the resistance based memory circuit includes a spin torque transfer magnetoresistive random access memory (STT-MRAM) and wherein the first design constraint includes a resistance of a magnetic tunnel junction (MTJ) of the STT-MRAM at a bit-zero state.

31. The apparatus of claim 30, wherein the second design constraint includes a width of the clamp transistor.

32. An apparatus comprising:
means for selecting a first parameter based on a first design constraint of a spin torque transfer magnetoresistive random access memory (STT-MRAM);
means for selecting a second parameter based on a second design constraint of the STT-MRAM; and
means for performing an iterative methodology to adjust at least one circuit parameter of a sense amplifier portion of the STT-MRAM by selectively adjusting a physical property of the at least one circuit parameter to achieve a desired sense amplifier margin value but without changing the first parameter or the second parameter.

33. The apparatus of claim 32, wherein the second design constraint includes a resistance of a magnetic tunnel junction (MTJ) of the STT-MRAM at a bit-zero state.

34. The apparatus of claim 33, wherein the second design constraint includes a width of a clamp transistor of a reference circuit of the sense amplifier portion and wherein the width of the clamp transistor is selected to be substantially a largest width that satisfies a spacing limit of the STT-MRAM.

35. The apparatus of claim 34, wherein the second design constraint includes a width of a clamp transistor of a reference circuit of the sense amplifier portion and wherein the resistance of the MTJ is a process parameter, wherein a signal margin increases and saturates with an increase of the width of the clamp transistor, and wherein the width of the clamp transistor is selected based on the signal margin and an area limitation.

36. The apparatus of claim 33, wherein the second design constraint includes a width of a clamp transistor of a reference circuit of the sense amplifier portion and wherein performing the iterative methodology includes:
determining a value of a gate voltage of the clamp transistor and a width of a load transistor that results in a substantially maximum sense amplifier margin; and
comparing a bit-one state current of the MTJ to a current threshold.

37. The apparatus of claim 36, wherein the second design constraint includes a width of a clamp transistor of a reference circuit of the sense amplifier portion and wherein performing the iterative methodology further includes:
when the bit-one state current of the MTJ exceeds the current threshold, iteratively reducing the gate voltage of the clamp transistor and determining the width of the load transistor that results in a substantially maximum sense amplifier margin given the gate voltage.

38. The apparatus of claim 37, wherein at least a portion of the iterative methodology is performed by an automated design tool and wherein the physical property is assigned an initial value prior to performing the iterative methodology.

39. An apparatus comprising:
a processor configured to:
receive a selection of a first parameter based on a first design constraint of a resistance based memory circuit;
receive a selection of a second parameter based on a second design constraint of the resistance based memory circuit; and
perform an iterative methodology to adjust at least one circuit parameter of a sense amplifier portion of the resistance based memory circuit by selectively assigning and adjusting a physical property of the at least one circuit parameter to achieve a desired sense amplifier margin value without changing the first parameter or the second parameter, wherein the at least one circuit parameter includes a gate voltage of a clamp transistor of a reference circuit within the sense amplifier portion; and a memory coupled to the processor, wherein the memory is configured to store the first parameter, the second parameter, and instructions that are executable by the processor to perform the iterative methodology.

40. The apparatus of claim 39, wherein the resistance based memory circuit includes a magnetoresistive random access memory (MRAM), a phase-change random access memory (PRAM), or a spin torque transfer MRAM (STT-MRAM),

41. The apparatus of claim 39, wherein the desired sense amplifier margin value is a substantially maximum amplifier signal margin given the first and second design constraints.

* * * * *

UNITED STATES PATENT AND TRADEMARK OFFICE
CERTIFICATE OF CORRECTION

PATENT NO. : 8,161,430 B2  
APPLICATION NO. : 12/107252  
DATED : April 17, 2012  
INVENTOR(S) : Seong-Ook Jung et al.

Page 1 of 1

It is certified that error appears in the above-identified patent and that said Letters Patent is hereby corrected as shown below:

Title Page, Item [73], After the first assignee, add the following:

Yonsei University, Seoul, Korea (KR)

To be listed as follows:

[73] Assignees: QUALCOMM Incorporated, San Diego, CA (US)
                Yonsei University, Seoul, Korea (KR)

Signed and Sealed this
Sixteenth Day of September, 2014

Michelle K. Lee
*Deputy Director of the United States Patent and Trademark Office*